(12) United States Patent
Yasukawa et al.

(10) Patent No.: US 11,006,451 B2
(45) Date of Patent: May 11, 2021

(54) USER EQUIPMENT AND SIGNAL TRANSMISSION METHOD

(71) Applicant: NTT DOCOMO, INC., Tokyo (JP)

(72) Inventors: Shimpei Yasukawa, Tokyo (JP); Satoshi Nagata, Tokyo (JP); Qun Zhao, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 162 days.

(21) Appl. No.: 16/092,604

(22) PCT Filed: Feb. 15, 2017

(86) PCT No.: PCT/JP2017/005465
§ 371 (c)(1),
(2) Date: Oct. 10, 2018

(87) PCT Pub. No.: WO2017/179286
PCT Pub. Date: Oct. 19, 2017

(65) Prior Publication Data
US 2019/0132818 A1    May 2, 2019

(30) Foreign Application Priority Data

Apr. 11, 2016   (JP) .................................. 2016-079185
Sep. 29, 2016   (JP) .............................. JP2016-192350

(51) Int. Cl.
*H04W 74/08*     (2009.01)
*H04W 72/08*     (2009.01)
(Continued)

(52) U.S. Cl.
CPC ....... *H04W 74/0816* (2013.01); *H04W 72/02* (2013.01); *H04W 72/08* (2013.01); *H04W 4/40* (2018.02); *H04W 74/0808* (2013.01)

(58) Field of Classification Search
CPC . H04W 74/0816; H04W 72/08; H04W 72/02; H04W 74/0808; H04W 4/40; H04W 92/18
See application file for complete search history.

(56) References Cited

U.S. PATENT DOCUMENTS

2017/0188391 A1*   6/2017   Rajagopal ......... H04W 74/0816
2017/0238321 A1*   8/2017   Sartori .................... H04W 4/40
                                                                455/452.1
(Continued)

OTHER PUBLICATIONS

Huawei, Collision avoidance for Mode 2, 3GPP TSG RAN WG1 Meeting #83, Anaheim, USA, Nov. 15-22, 2015; R1-156932 (Year: 2015).*
(Continued)

*Primary Examiner* — Shailendra Kumar
(74) *Attorney, Agent, or Firm* — Osha Bergman Watanabe & Burton LLP

(57) ABSTRACT

There is provided user equipment that selects a resource for transmitting a signal based on a sensing result. The user equipment includes a detection unit that detects, by performing sensing in a time window for sensing, one or more resources capable of transmitting a signal in a time window for resource selection after the time window for sensing; a selection unit that selects a resource for transmitting a signal from the one or more detected resources; and a transmission unit that transmits the signal using the selected resource for transmitting the signal.

7 Claims, 21 Drawing Sheets

(51) Int. Cl.
*H04W 72/02* (2009.01)
*H04W 4/40* (2018.01)

(56) References Cited

U.S. PATENT DOCUMENTS

2018/0020387 A1* 1/2018 Van Der Velde ..... H04W 74/02
2019/0075548 A1* 3/2019 Lee ....................... H04W 88/06
2019/0239193 A1* 8/2019 Rudolf ................ H04L 12/1863

OTHER PUBLICATIONS

LG Electronics, System level evaluation results of PC5 based V2V resource allocation options, 3GPP TSG RAN WG1 Meeting #84, Busan, Korea, Apr. 11-15, 2016; R1-162480. (Year: 2016).*

Huawei et al., Details of sensing based collision avoidance, 3GPP TSG RAN WG1 Meeting #84, Busan, Korea, Apr. 11-15, 2016; R1-162641 (Year: 2016).*

3rd Generation Partnership Project; Technical Specification Group Radio Access Network; Evolved Universal Terrestrial Radio Access (E-UTRA) and Evolved Universal Terrestrial Radio Access Network , 3GPP TS 36.300 V13.2.0 (Dec. 2015). (Year: 2015).*

Extended European Search Report issued in counterpart European Patent Application No. 17782105.5, dated Oct. 15, 2019 (9 Pages).

Huawei et. al.; "Collision avoidance for Mode 2"; 3GPP TSG RAN WG1Meeting #83, R1-156932; Anaheim, USA, Nov. 15-22, 2015 (6 Pages).

Huawei et. al.; "Discussion on group priority for D2D communication"; 3GPP TSG RAN WG1 Meeting #82, R1-154339; Beijing, China, Aug. 24-28, 2015 (4 Pages).

International Search Report issued in PCT/JP2017/005465, dated May 16, 2017 (4 pages).

Written Opinion of the International Searching Authority issued in PCT/JP2017/005465, dated May 16, 2017 (9 pages).

Balazs Bertenyi, Chairman of 3GPP TSG SA; "Key drivers for LTE success: Services Evolution"; 3GPP Seminar, LTE Asia; Sep. 6, 2011 (15 pages).

3GPP TS 36.300 V13.2.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)", Dec. 2015 (290 pages).

Huawei et al.; "Details of sensing based collision avoidance"; 3GPP TSG RAN WG1 Meeting #84, R1-162641; Busan, Korea; Apr. 11-15, 2016 (8 pages).

LG Electronics; "System level evaluation results of PC5 based V2V resource allocation options"; 3GPP TSG RAN WG1 Meeting #84bis, R1-162480; Busan, Korea; Apr. 11-15, 2016 (4 pages).

* cited by examiner

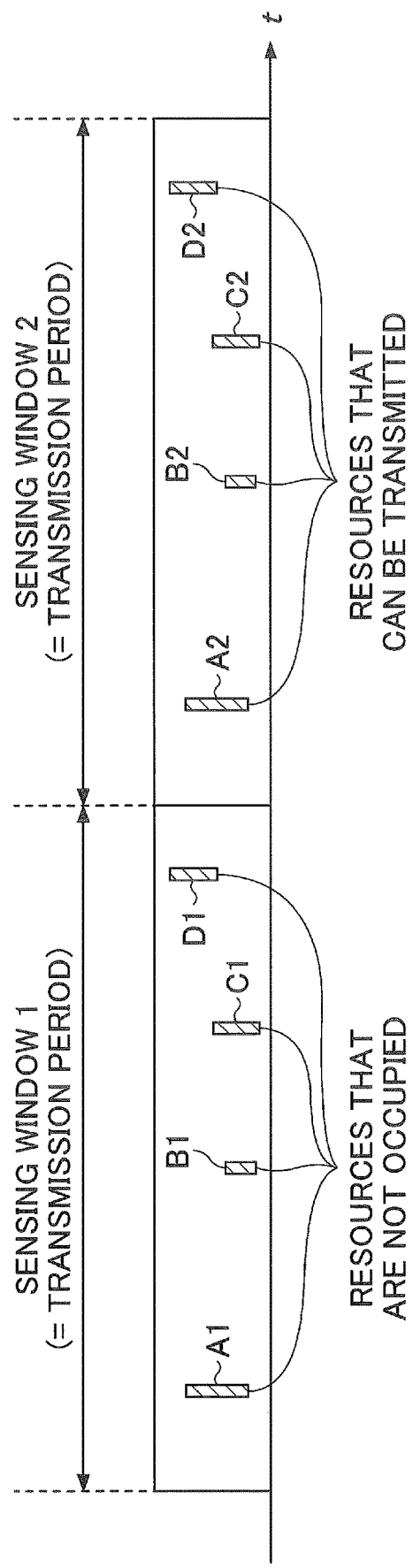

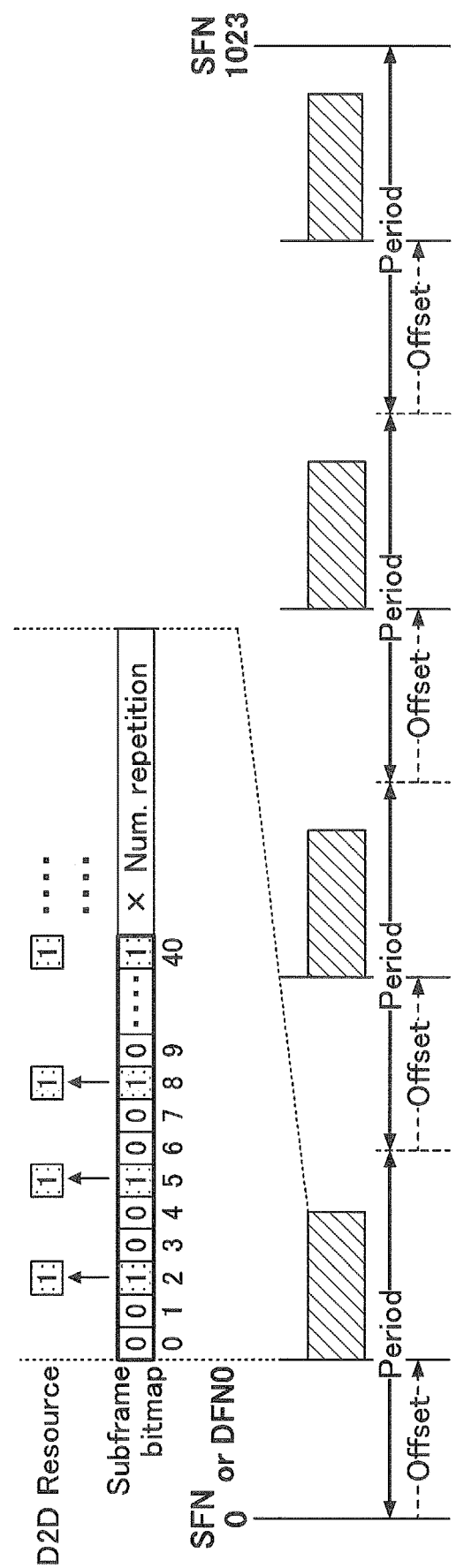

USER EQUIPMENT AND SIGNAL TRANSMISSION METHOD

TECHNICAL FIELD

The present invention relates to user equipment and a signal transmission method.

BACKGROUND ART

In Long Term Evolution (LTE) and successor systems (for example, also referred to as LTE Advanced (LTE-A), 4G, Future Radio Access (FRA), 5G, and the like) of LTE, Device to Device (D2D) technology has been studied in which units of user equipment directly communicate with each other without going through a radio base station (for example, Non-Patent Document 1).

D2D reduces the traffic between the user equipment and the base station, or enables communication between units of user equipment even in a case where communication with the base station is not possible in the event of a disaster or the like.

D2D is classified roughly according to D2D discovery for finding other communicable units of user equipment and D2D communication (also referred to as D2D direct communication, D2D communication, inter-terminal direct communication, and the like) for performing direct communication between units of user equipment. Hereinafter, when D2D communication, D2D discovery, and the like are not particularly distinguished from each other, these are simply referred to as D2D. In addition, a signal transmitted and received by D2D is referred to as a D2D signal.

In addition, in 3rd Generation Partnership Project (3GPP), it has been studied to achieve V2X by extending the D2D function. Here, the V2X is a part of Intelligent Transport Systems (ITS). As shown in FIG. 1, the V2X is a generic term for Vehicle to Vehicle (V2V) that means a mode of communication performed between vehicles, Vehicle to Infrastructure (V2I) that means a mode of communication performed between a vehicle and a Road-Side Unit (RSU) installed at the side of the road, Vehicle to Nomadic device (V2N) that means a mode of communication performed between a vehicle and a mobile terminal of the driver, and Vehicle to Pedestrian (V2P) that means a mode of communication performed between a vehicle and a mobile terminal of a pedestrian.

CITATION LIST

Non-Patent Document

Non-Patent Document 1: "Key drivers for LTE success: Services Evolution", September, 2011, 3GPP, Internet URL: http://www.3gpp.org/ftp/Information/presentations/presentations_2011/2011_09_LTE_Asia/2011_LTE-Asia_3GPP_Service_evolution.pdf
Non-Patent Document 2: 3GPP TS36.300 V13.2.0 (2015-12)

SUMMARY OF THE INVENTION

Problem to be Solved by the Invention

The technology of V2X is based on the technology of D2D specified in LTE. In the technology of D2D, a method in which user equipment selects resources to transmit the D2D signal is classified roughly according to a method of dynamically allocating resources from a base station and a method in which the user equipment autonomously selects resources. In V2X, especially, in V2V, since units of user equipment (for example, vehicles) are present at high density and move at high speed, the method of dynamically allocating resources is not efficient. Accordingly, it is assumed that a method is to be used in which units of user equipment autonomously select resources.

In addition, it is assumed that, in V2V, when the user equipment autonomously selects resources, the selected resources are semi-persistently used instead of selecting resources each time a packet is transmitted. Then, for example, when a problem (for example, a conflict) occurs in resources to be used, resources are reselected.

When a plurality of units of user equipment autonomously select (reselection is included) transmission resources, if each user equipment freely selects resources, a resource conflict occurs. Accordingly, the user equipment on the reception side cannot appropriately receive the signal.

Therefore, a sensing-based resource selection method for selecting resources, which are not used (occupied), by performing resource sensing has been proposed. A specific example is shown with reference to FIG. 2. In the example shown in FIG. 2, it is assumed that a time window in which user equipment performs sensing (referred to as a "sensing window") is set in advance and the size (period) of the sensing window is set to be the same as a period at which the user equipment transmits a packet semi-persistently. In the example shown in FIG. 2, the user equipment detects resources (A1 to D1), which are not occupied, by performing sensing in a sensing window 1. Since it can be determined that the detected resources are not occupied in the next sensing window 2, the user equipment considers resources (A2 to D2) corresponding to the resources (A1 to D1) that are not occupied, in the next sensing window 2, to be resources capable of transmitting a D2D signal, and selects a resource (for example, A2) from the resources (A2 to D2) to start transmission of the D2D signal.

However, in the resource selection method described above, since the user equipment selects one of resources not occupied in the sensing window, there is a problem that a delay may occur particularly when trying new communication depending on the resource to be selected. For example, in FIG. 2, in a case where the user equipment starts transmission of the D2D signal with the resource D2, there is a delay until the transmission of the D2D signal is started compared with a case where the transmission of the D2D signal is started with the resource A2. On the other hand, it is also considered that user equipment UE can suppress the delay by selecting the resource A2 capable of transmitting the D2D signal at an earlier timing. However, if such an operation is allowed, in a case where a plurality of units of user equipment try to perform communication newly, there is a possibility that all of the units of user equipment select the resource A2. As a result, signal collision occurs between the units of user equipment UE.

Considering that V2X is a type of D2D, the above problem is not limited to V2X, but is a problem that can occur in general in D2D.

The disclosed technique has been made in view of the above, and the object is to provide a technique enabling appropriate communication while reducing a delay in a method of selecting a resource for transmitting a signal based on a sensing result.

Means for Solving Problem

User equipment of the disclosed technique is user equipment that selects a resource for transmitting a signal based on a sensing result. The user equipment includes a detection unit that detects, by performing sensing in a time window for sensing, one or more resources capable of transmitting a signal in a time window for resource selection after the time window for sensing; a selection unit that selects a resource for transmitting a signal from the one or more detected resources; and a transmission unit that transmits the signal using the selected resource for transmitting the signal.

Effect of the Invention

According to the disclosed technique, there is provided a technique enabling appropriate communication while reducing a delay in the method of selecting a resource for transmitting a signal based on a sensing result.

BRIEF DESCRIPTION OF DRAWINGS

FIG. 2 is a diagram illustrating a problem;
FIG. 9A is a diagram illustrating a resource pool configuration.

MODE(S) FOR CARRYING OUT THE INVENTION

Hereinafter, an embodiment of the invention will be described with reference to the diagrams. In addition, the embodiment described below is merely an example, and embodiments to which the invention is applied are not limited to the following embodiment. For example, a radio communication system according to the present embodiment is assumed to be a system using a method based on the LTE. However, the invention is not limited to the LTE, but can be applied to other methods. In addition, in this specification and the appended claims, "LTE" is used in a broad sense including not only the communication method corresponding to the release 8 or 9 of 3GPP but also the fifth generation communication methods corresponding to the release 10, 11, 12, and 13 or the release 14 and subsequent ones of 3GPP.

In addition, although the present embodiment is mainly for V2X, the technique according to the present embodiment is not limited to V2X but can be applied to D2D in general. In addition, "D2D" includes V2X as its meaning.

In addition, "D2D" is used in a broad sense including not only a process for transmitting and receiving the D2D signal between the units of user equipment UE but also a process, in which the base station receives (monitors) the D2D signal, and a process, in which the user equipment UE transmits an uplink signal to a base station eNB in the case of RRC idle or in a case where a connection with the base station eNB is not established.

<Overview of D2D>

An overview of D2D specified in LTE will be described. In addition, also in V2X, it is possible to use the technology of D2D described herein, and the UE according to the embodiment of the invention can transmit and receive the D2D signal using the technology.

Figure 1:
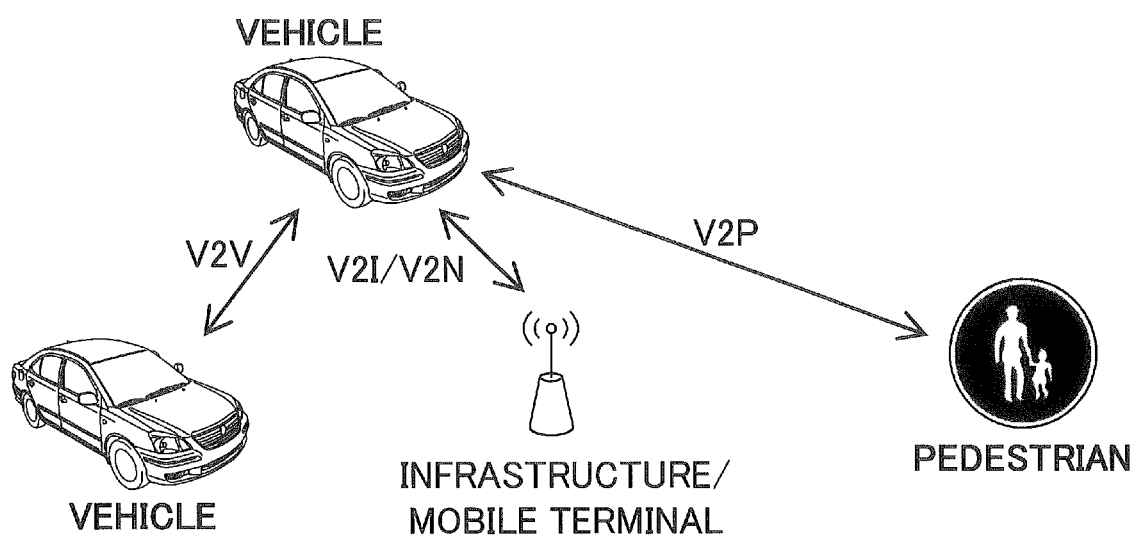
FIG. 1 is a diagram illustrating V2X.
Figure 3A:
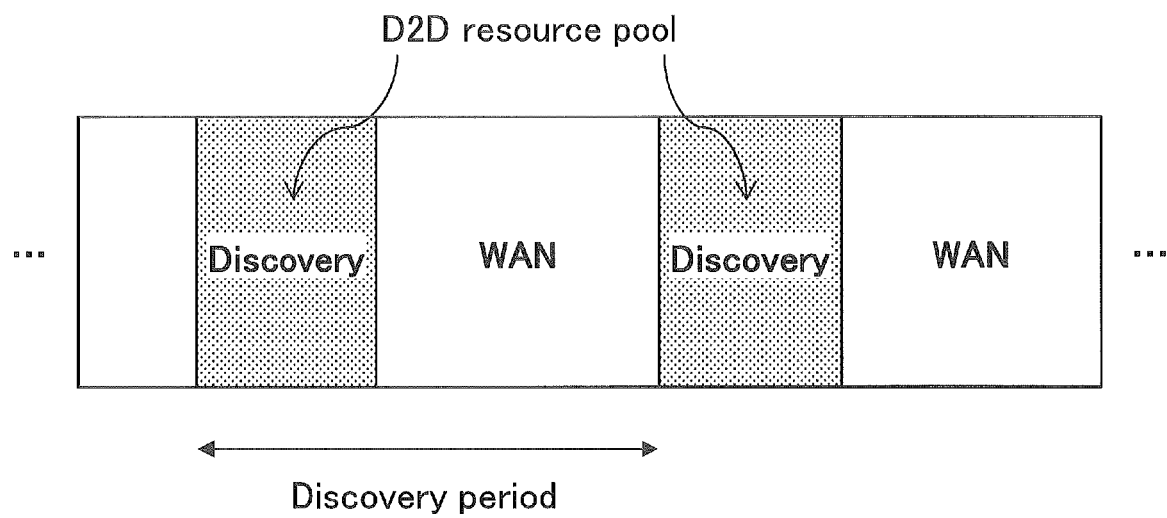
FIG. 3A is a diagram illustrating D2D.

As already described, D2D is roughly divided into "D2D discovery" and "D2D communication". For "D2D discovery", as shown in FIG. 3A, for each Discovery period, a resource pool for a Discovery message is secured, and the user equipment UE transmits a Discovery message (discovery signal) in the resource pool. More specifically, there are Type 1 and Type 2b. In Type 1, the user equipment UE autonomously selects a transmission resource from the resource pool. In Type 2b, quasi-static resources can be allocated by upper layer signaling (for example, RRC signal).

Figure 3B:
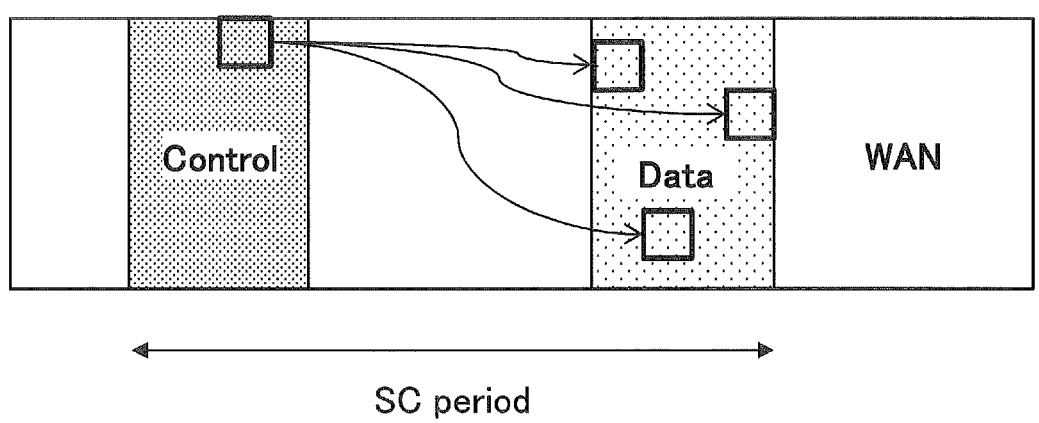
FIG. 3B is a diagram illustrating D2D.

Also for "D2D communication", as shown in FIG. 3B, a resource pool for SCI/data transmission is periodically secured. The user equipment UE on the transmission side notifies the reception side of resources for data transmission (PSSCH resource pool) or the like by the SCI with a resource selected from the Control resource pool (PSCCH resource pool), and transmits data with the resources for data transmission. For more details on "D2D communication", there are Mode 1 and Mode 2. In Mode 1, resources are dynamically allocated by (E) PDCCH transmitted to the user equipment UE from the base station eNB. In Mode 2, the user equipment UE autonomously selects a transmission resource from the resource pool. A resource pool is notified by SIB, or a resource pool defined in advance is used.

In LTE, a channel used in "D2D discovery" is referred to as a Physical Sidelink Discovery Channel (PSDCH), a channel for transmitting control information, such as SCI, in "D2D communication" is referred to as a Physical Sidelink Control Channel (PSCCH), and a channel for transmitting data is referred to as a Physical Sidelink Shared Channel (PSSCH) (Non-Patent Document 2).

Figure 4:
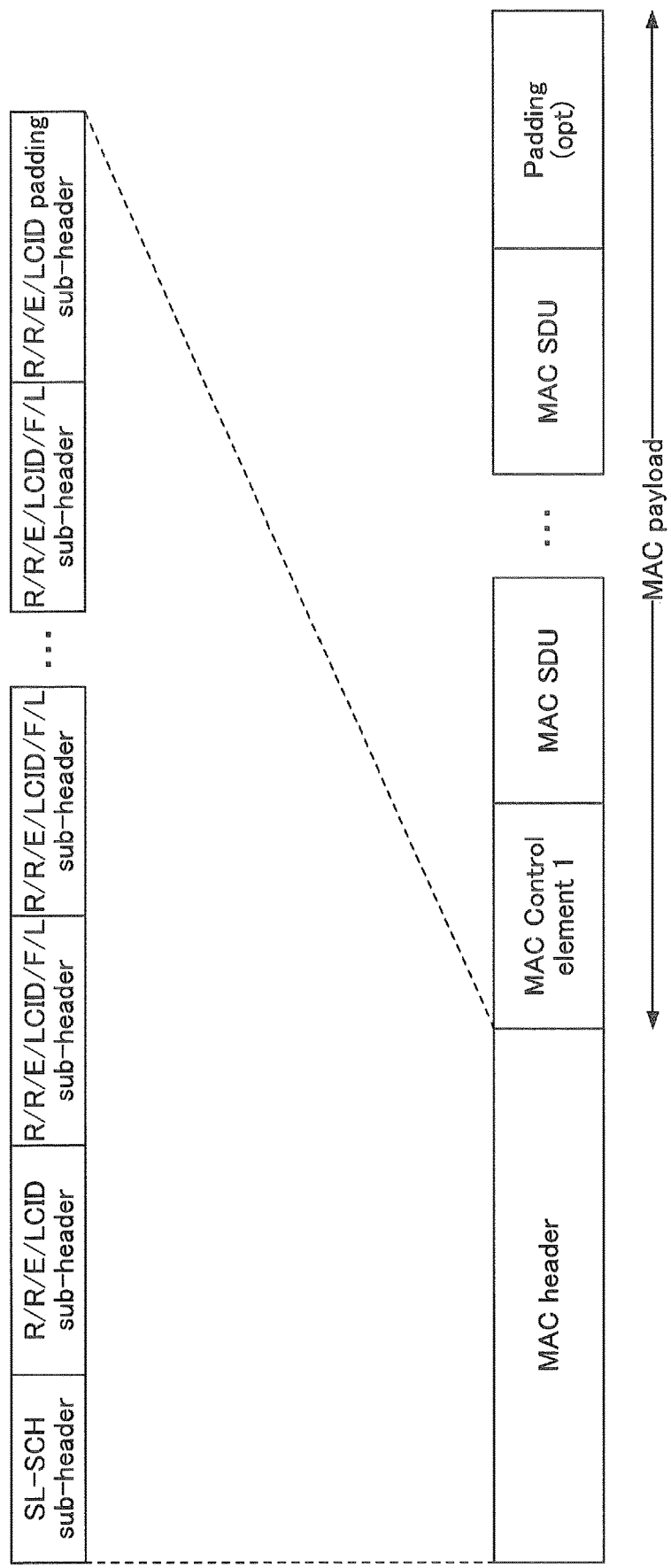
FIG. 4 is a diagram illustrating MAC PDU used in D2D communication.

As shown in FIG. 4, a Medium Access Control (MAC) Protocol Data Unit (PDU) used in D2D communication is configured to include at least MAC header, MAC Control element, MAC Service Data Unit (SDU), and Padding. The MAC PDU may also include other pieces of information. The MAC header includes one Sidelink Shared Channel (SL-SCH) subheader and one or more MAC PDU subheaders.

Figure 5:
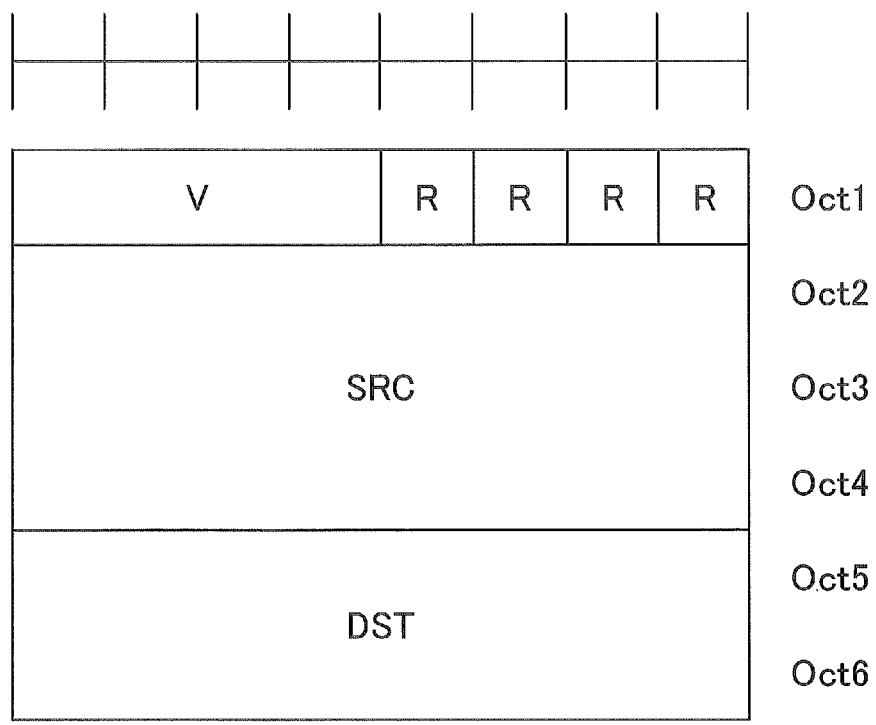
FIG. 5 is a diagram illustrating a format of SL-SCH subheader.

As shown in FIG. 5, the SL-SCH subheader includes MAC PDU format version, transmission source information (SRC), transmission destination information (DST), Reserved bit (R), and the like. V is allocated to the head of the SL-SCH subheader, and indicates a MAC PDU format version used by the user equipment UE. Information regarding the transmission source is set in the transmission source information. An identifier for ProSe UE ID may be set in the transmission source information. Information regarding the transmission destination is set in the transmission destination information. Information regarding ProSe Layer-2 Group ID of the transmission destination may be set in the transmission destination information.

Figure 6:
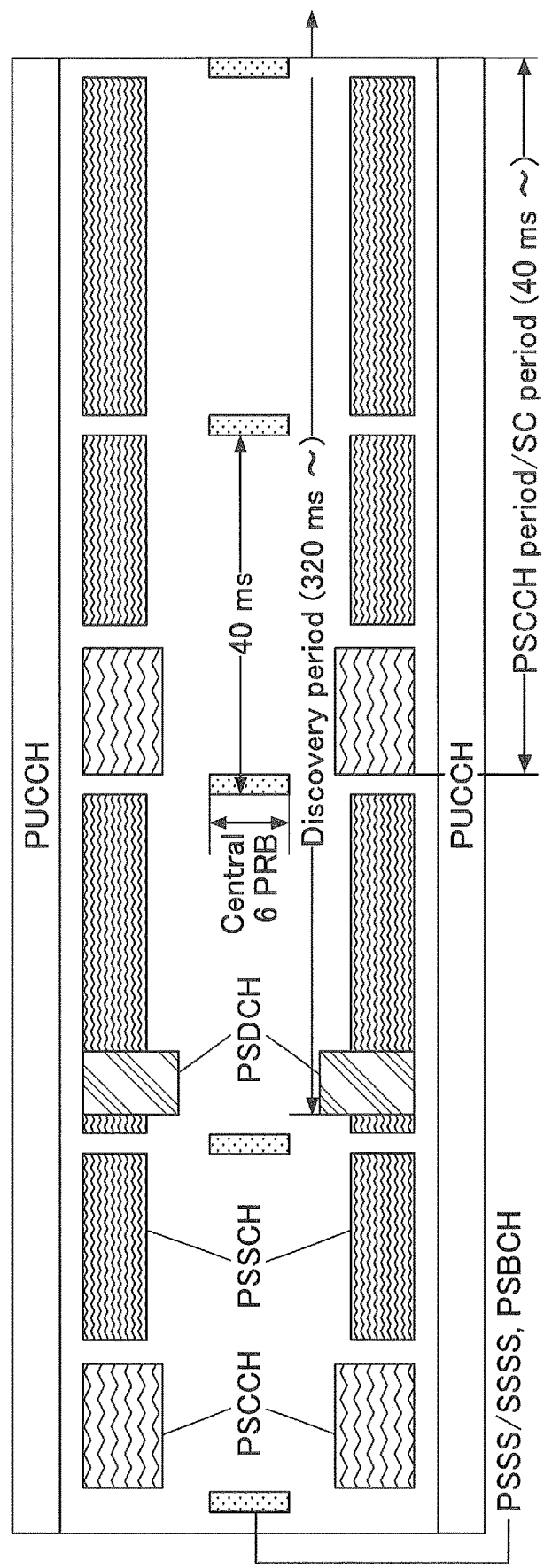
FIG. 6 is a diagram illustrating an example of the channel structure used in D2D.

FIG. 6 shows an example of the channel structure of D2D. As shown in FIG. 6, a resource pool of PSCCH and a resource pool of PSSCH that are used in "D2D communication" are allocated. In addition, a resource pool of PSDCH used in "D2D discovery" is allocated at a period longer than the period of the channel of "D2D communication".

In addition, a Primary Sidelink Synchronization signal (PSSS) and a Secondary Sidelink Synchronization signal (SSSS) are used as synchronizing signals for D2D. In addition, a Physical Sidelink Broadcast Channel (PSBCH) for transmitting broadcast information of a system band of D2D, a frame number, resource configuration information, and the like is used, for example, for operation outside coverage.

Figure 7A:
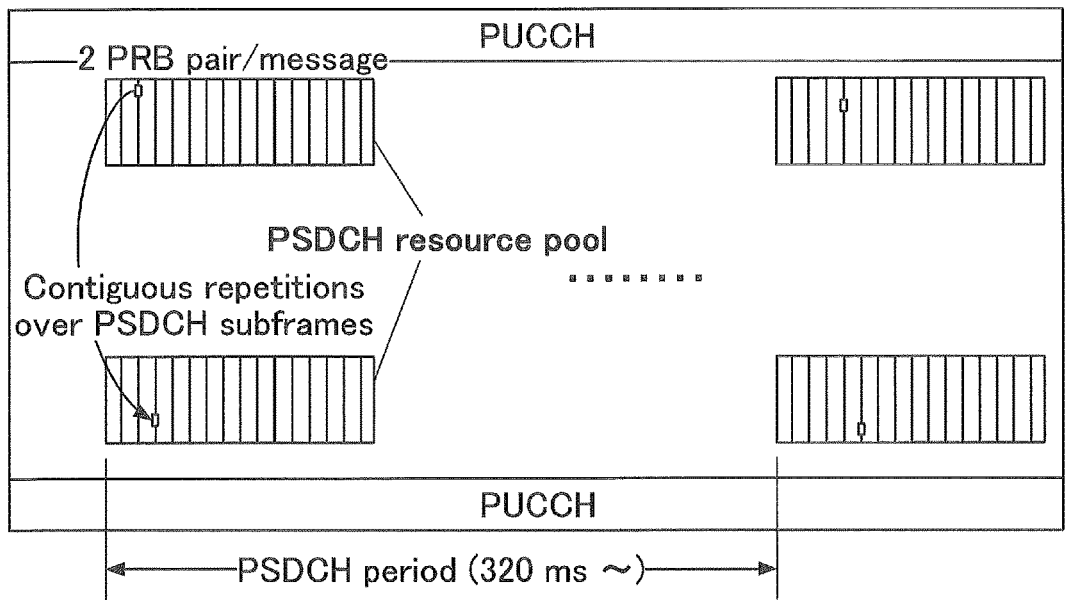
FIG. 7A is a diagram illustrating the structure example of PSDCH.
Figure 7B:
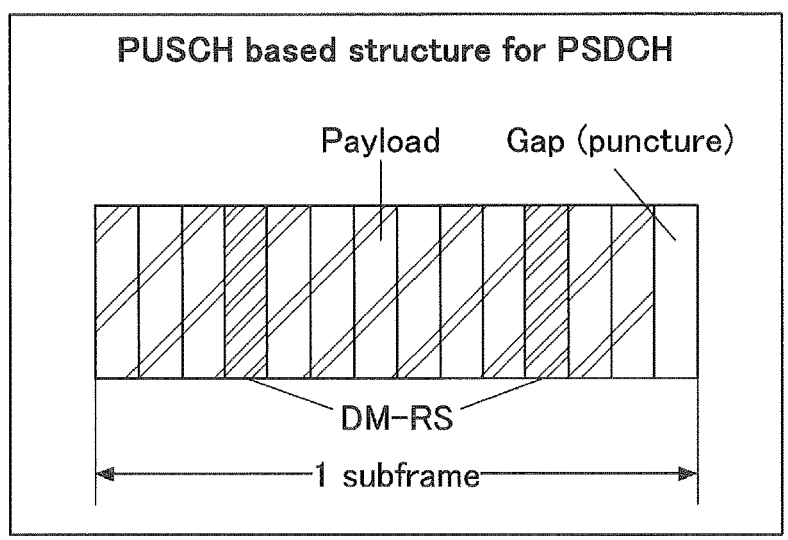
FIG. 7B is a diagram illustrating the structure example of PSDCH.

FIG. 7A shows an example of a resource pool of PSDCH used in "D2D discovery". Since the resource pool is set by the bitmap of the subframe, the resource pool becomes a resource pool of an image shown in FIG. 7A. This is the same for the resource pools of other channels. In addition, PSDCH is repeatedly transmitted (repetition) while performing frequency hopping. The number of repetitions can be set to, for example, 0 to 4. In addition, as shown in FIG. 7B, PSDCH has a PUSCH based structure, and has a structure in which demodulation reference signal (DM-RS) is inserted.

Figure 8A:
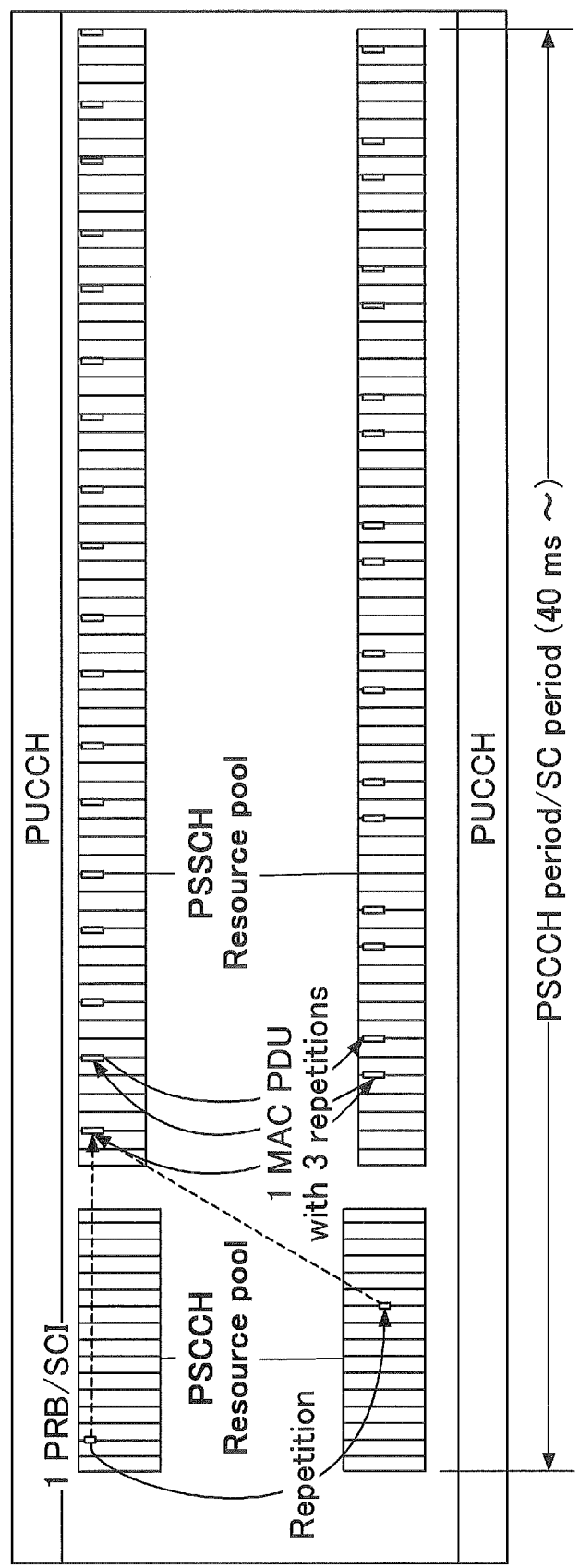
FIG. 8A is a diagram illustrating the structure example of PSCCH and PSSCH.
Figure 8B:
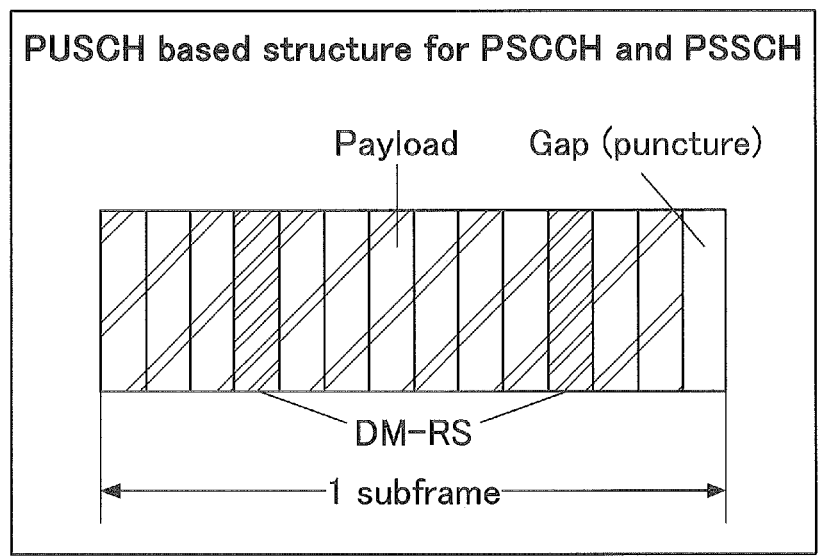
FIG. 8B is a diagram illustrating the structure example of PSCCH and PSSCH.

FIG. 8A shows examples of resource pools of PSCCH and PSSCH used in "D2D communication". As shown in FIG. 8A, PSCCH is repeatedly transmitted (repetition) twice including the first time while performing frequency hopping. PSCCH is repeatedly transmitted (repetition) four times including the first time while performing frequency hopping. In addition, as shown in FIG. 8B, PSCCH and PSSCH have a PUSCH based structure, and have a structure in which DM-RS is inserted.

Figure 9B:
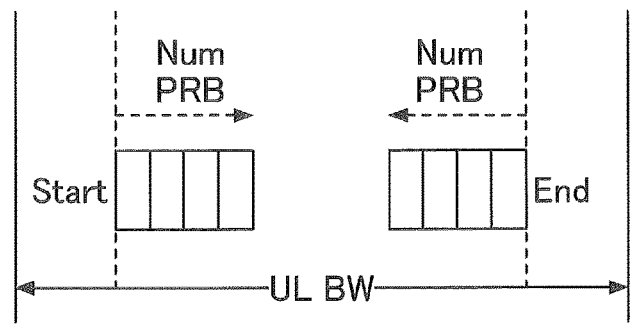
FIG. 9B is a diagram illustrating a resource pool configuration.

FIGS. 9A-9B show an example of the resource pool configuration in PSCCH, PSDCH, and PSSCH (Mode 2). As shown in FIG. 9A, in a time direction, the resource pool is expressed as a subframe bitmap. In addition, the bitmap is repeated by the number of times of num. reprtition. In addition, offset indicating the start position in each period is designated.

In a frequency direction, contiguous allocation and non-contiguous allocation are possible. FIG. 9B shows an example of non-contiguous. As shown in FIG. 9B, start PRB, End PRB, and the number of PRBs (numPRB) are designated.

<System Configuration>

Figure 10:
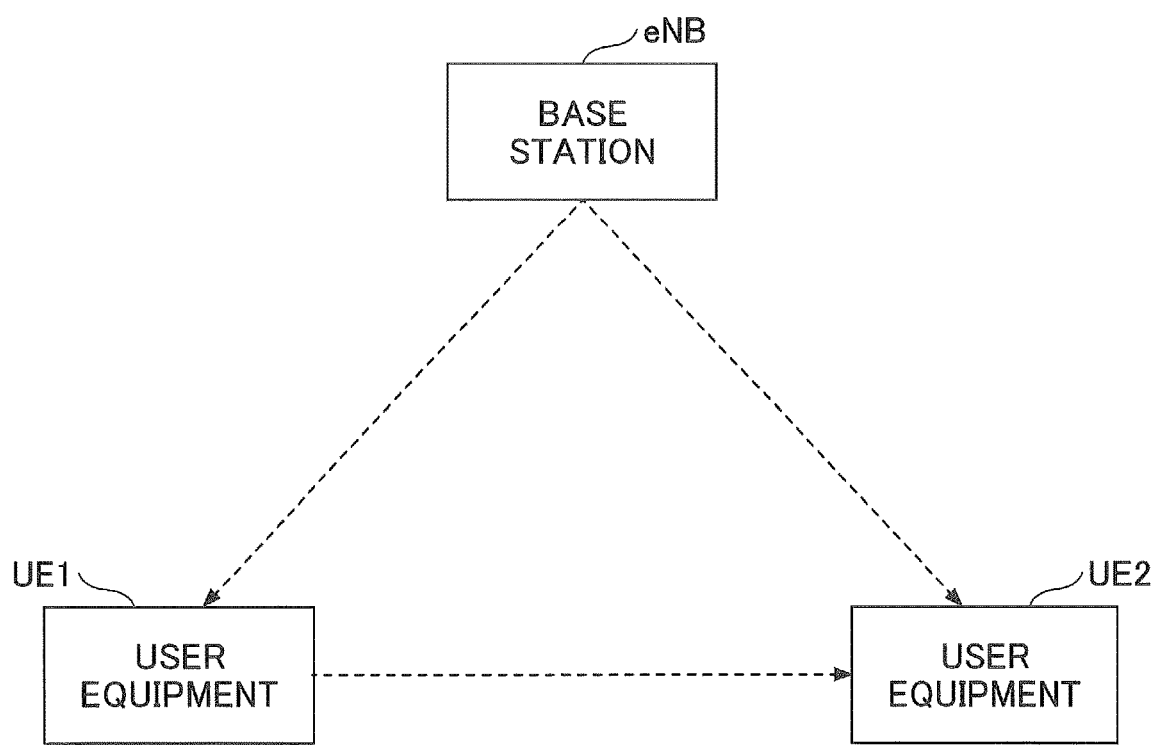
FIG. 10 is a diagram illustrating an example of the configuration of a radio communication system according to an embodiment.

FIG. 10 is a diagram showing an example of the configuration of the radio communication system according to the embodiment. As shown in FIG. 10, the radio communication system according to the present embodiment has the base station eNB, user equipment UE1, and user equipment UE2. In FIG. 10, it is intended that the user equipment UE1 is a transmission side and the user equipment UE2 is a reception side. However, each of the user equipment UE1 and the user equipment UE2 has both a transmission function and a reception function. Hereinafter, in a case where the user equipment UE1 and the user equipment UE2 are not particularly distinguished from each other, the user equipment is simply described as the "user equipment UE".

Each of the user equipment UE1 and the user equipment UE2 shown in FIG. 10 has a function of cellular communication as the user equipment UE in LTE and a D2D function including signal transmission and reception in the above-described channels. In addition, each of the user equipment UE1 and the user equipment UE2 has a function of executing the operation described in the present embodiment. In addition, for the function of cellular communication and the function of the existing D2D, each of the user equipment UE1 and the user equipment UE2 may have only some of the functions (range in which the operation described in the present embodiment can be executed), or may have all the functions.

In addition, although each user equipment UE may be any device having the function of D2D, each user equipment UE is, for example, a vehicle, a terminal held by a pedestrian, or an RSU (UE type RSU having a UE function).

In addition, for the base station eNB, each user equipment UE has a function of cellular communication as the base station eNB in LTE and functions (a resource allocation function, a configuration information notification function, and the like) for enabling the communication of the user equipment UE in the present embodiment. In addition, the base station eNB includes an RSU (eNB type RSU having an eNB function).

Basically, in the present embodiment, the user equipment UE selects resources, which are not occupied, by performing sensing in a sensing window, and periodically transmits a D2D signal semi-persistently using the selected resources. "Sensing" is performed, for example, using a method of measuring received power (may be referred to as received energy or received intensity), or by receiving the SCI transmitted from other units of user equipment UE, decoding the SCI, and detecting the resource positions of the allocated SCI and data, or by combining these. "Resource" includes a time resource (for example, a subframe) or a time and frequency resource (for example, a subchannel) unless otherwise noted. "D2D signal" may be SCI, or may be data, or may be a set of SCI and data. In addition, the D2D signal may be a discovery signal.

<Regarding Resource Selection and Transmission Operation>

(Regarding a Selection Window)

Subsequently, a resource selection method when the user equipment UE according to the present embodiment intends to start transmission of the D2D signal and an operation of transmitting the D2D signal will be described. In the sensing-based resource selection method described with reference to FIG. 2, the user equipment UE detects resources, which are not occupied, by performing sensing in a sensing window, and selects a resource from resources capable of transmitting a signal in the next sensing window to start transmission of the D2D signal.

On the other hand, in the present embodiment, a time window (hereinafter, referred to as a "selection window") indicating a range for selecting a resource to transmit the D2D signal is provided in a time window corresponding to the next sensing window, and the user equipment UE selects one of the resources in the selection window to start transmission of the D2D signal.

Figure 11:
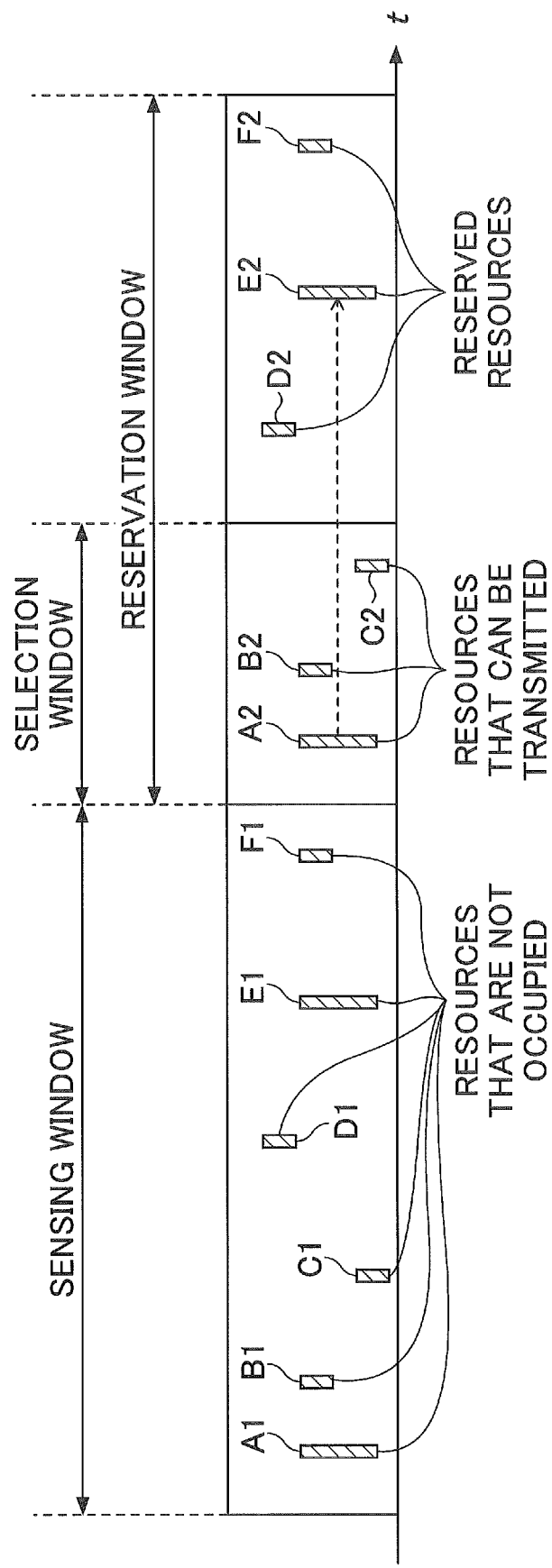
FIG. 11 is a diagram illustrating an example of a transmission operation performed by user equipment.

FIG. 11 is a diagram illustrating an example of a transmission operation performed by the user equipment. For example, it is assumed that the user equipment UE detects resources (A1 to F1), which are not occupied, by performing sensing in a sensing window. In this case, in the resource selection method described above, the user equipment UE starts transmission of the D2D signal using any resource among resources (A2 to F2) capable of transmitting the D2D signal. On the other hand, in the present embodiment, the user equipment UE starts transmission of the D2D signal using any resource among the resources (A2 to C2) corresponding to the selection window. Therefore, since the user equipment UE selects a resource in the limited selection window, it is possible to shorten the delay required from the time when it is determined to transmit the D2D signal until the actual transmission of the D2D signal is started. In addition, by providing the selection window, it is possible to shorten the delay more effectively particularly in a case where a period of transmitting the D2D signal semi-persistently is long (that is, in a case where the size of the sensing window is long).

The selection window is set after the sensing window. The size of the selection window needs to be set to at most the size of the sensing window or less. In addition, considering the effect of delay reduction, it is preferable that the size of the selection window is shorter than the size of the sensing window. In addition, the selection window does not necessarily need to be set subsequent to the sensing window. For example, it is also possible to set the start timing of the selection window after a predetermined offset (after several subframes or the like) from the end timing of the sensing window.

(Regarding a Reservation Window)

In the present embodiment, the user equipment UE selects a resource in the selection window to start transmission of the D2D signal, but it is also assumed that it is desired to start transmission of the D2D signal outside the range of the selection window. For example, in FIG. 11, it is also assumed that it is desired to start transmission of the D2D signal using the resource E2. In order to respond to such a case, in the present embodiment, a time window (hereinafter, referred to as a "reservation window") indicating a range in which a resource can be reserved may be provided in a time window corresponding to the next sensing window, so that the user equipment UE can reserve a resource within the reservation window.

For example, in a case where it is necessary to start transmission of the D2D signal with the resource E2, the user equipment UE selects one of the resources A2 to C2 in the selection window, and transmits a D2D signal including reservation information, which indicates that the resource E2 is reserved, with the selected resource. Therefore, other units of user equipment UE that have received the reservation information can detect that the resource E2 is reserved. In addition, the reservation information may include configuration information indicating a period of transmitting the D2D signal semi-persistently.

In order to avoid resource conflicts, the size of the reservation window needs to be set to at most the size of the sensing window or less. In addition, the reservation window and the selection windows may overlap each other, or may be set subsequent to the selection window. The reservation window can be set to the size of the sensing window or less by using a predetermined window or a window set from the base station eNB.

While it is effective to reduce the delay at the time of resource conflict by enabling resource reservation to reduce the probability of resource conflict, excessive resource reservation of the user equipment UE may restrict selectable resources of the other units of user equipment UE. The reservation window is also effective for suppressing such excessive resource reservation. For example, the base station eNB may set the reservation window using upper layer signaling (RRC message or the like) or broadcast information (SIB), or the window size that can be reserved by the user equipment UE may be limited in advance. For such purpose, the base station eNB may limit the number of resources that can be reserved, the number of reservation processes, the number of times of transmission of the D2D signals, or/and the time occupancy of resources for transmitting the D2D signal instead of the reservation window or in addition to the reservation window. For example, in a case where the number of reservation processes is limited to 1, the user equipment UE reserves only a resource that can be scheduled with one MAC PDU or one SCI transmission. In addition, the user equipment UE may transmit a signaling notifying that the reservation resource is to be released. Therefore, an effect of releasing resources, which are not necessary for the user equipment UE, is also expected.

In the case of charging for the transmission of the D2D signal, there is a method of causing the user equipment UE to report the number of transmission bits to the network for charging. In this case, data transmission may always be performed unless the release notice of the resource reserved by the user equipment UE is not given, or the user equipment UE may be made to perform an operation of adding the number of transmission bits to the bill on the assumption that data has always been transmitted unless the release notice of the reserved resource is not given. In the latter case, it is necessary to determine Modulation Coding Scheme (MCS) for converting the number of transmission bits. This may be calculated based on the most recently selected MCS. For example, this may be calculated using an MCS scheduled to be used for transmission of data corresponding to SCI including reservation information or the number of bits of the data. In addition, the above may be realized using a predetermined MCS or an MCS set from the base station eNB instead of the most recently selected MCS.

(Regarding a Sensing Window)

In the present embodiment, the size of the sensing window may be set to be the same as a period (Semi-Persistent scheduling (SPS) period), at which the user equipment UE transmits a packet semi-persistently, or a time interval, at which resource reservation is possible (period at which resource reservation is possible), or may be set to M times (M is an integer of 1 or more) the period. For example, in a case where the SPS period or the time interval at which resource reservation is possible is 100 ms, the sensing window may be set to 100 ms, 200 ms, 300 ms, or the like. In addition, in a case where the SPS period or the time interval at which resource reservation is possible differs between the units of user equipment UE, it is preferable to set the size of the sensing window to M times (M is an integer of 1 or more) the longest period.

(Regarding a Resource Selection Method in a Selection Window)

As shown in FIG. 11, in a case where there are a plurality of resources (selectable resources) capable of transmitting the D2D signal in the selection window, the user equipment UE may randomly select a resource from the plurality of resources. In a case where there are a plurality of units of user equipment UE, resources selected among the units of user equipment UE are randomized.

In addition, as another method, the user equipment UE may select a resource from a plurality of resources based on predetermined conditions. The predetermined conditions may be any conditions. For example, the predetermined conditions may be the quality (for example, a channel state of peripheral resources) of a channel, or may be whether or not it is possible to transmit the D2D signal with the resource (for example, it is scheduled to transmit a UL signal to the base station eNB or a gap where the D2D signal can be transmitted from the base station eNB is set), or may be whether or not it is necessary to monitor other D2D signals on the resource, or may be how much delay is allowed. For example, in a case where the user equipment UE is connected to a part other than the Sidelink carrier (carrier capable of transmitting the D2D signal), in a case where a gap where the D2D signal can be transmitted and received is set, the user equipment UE may select a resource only in subframes within the gap where the D2D signal can be transmitted, or may perform sensing only in subframes within the gap where the D2D signal can be received. By applying these operations in a case where the transmission and reception capability of the user equipment UE is insufficient, it is possible to perform efficient switching between carriers of a transceiver.

In addition, the user equipment UE may determine autonomously or based on an instruction from the base station eNB whether to randomly select a resource from a plurality of resources or to select a resource from a plurality of resources based on predetermined conditions.

(Supplementary Matters Regarding Resource Selection and Transmission Operation)

In the present embodiment, the user equipment UE does not need to perform sensing again before actually transmitting the D2D signal after selecting the resource to transmit the D2D signal in the selection window.

In addition, in the case of transmitting the D2D signal semi-persistently, the user equipment UE needs only to perform sensing when starting transmission of the D2D signal first, and does not need to perform sensing again before transmitting the D2D signal periodically from the second time. In addition, the user equipment UE may perform sensing in the background (that is, may perform sensing at a timing (subframe) at which no D2D signal is transmitted), and reselect a resource in a case where the possibility of signal collision with another user equipment UE is detected.

<Regarding a Configuration Method of Start Timing and End Timing of Each Window>

Subsequently, a configuration method and a recognition method of the start timing and the end timing of the sensing window, the selection window, and the reservation window will be described.

(Configuration Method 1)

In configuration method 1, the start timing and the end timing of the sensing window, the selection window, and the reservation window are dynamically determined based on a timing at which the user equipment UE selects a resource for transmitting the D2D signal. The timing at which the user equipment UE selects a resource for transmitting the D2D signal is, for example, a timing at which a transmission packet is generated by an upper layer (for example, a V2X application) and notification of the presence of a transmission packet is sent to a layer (for example, an MAC layer or a physical layer) for selecting a resource.

Figure 12:
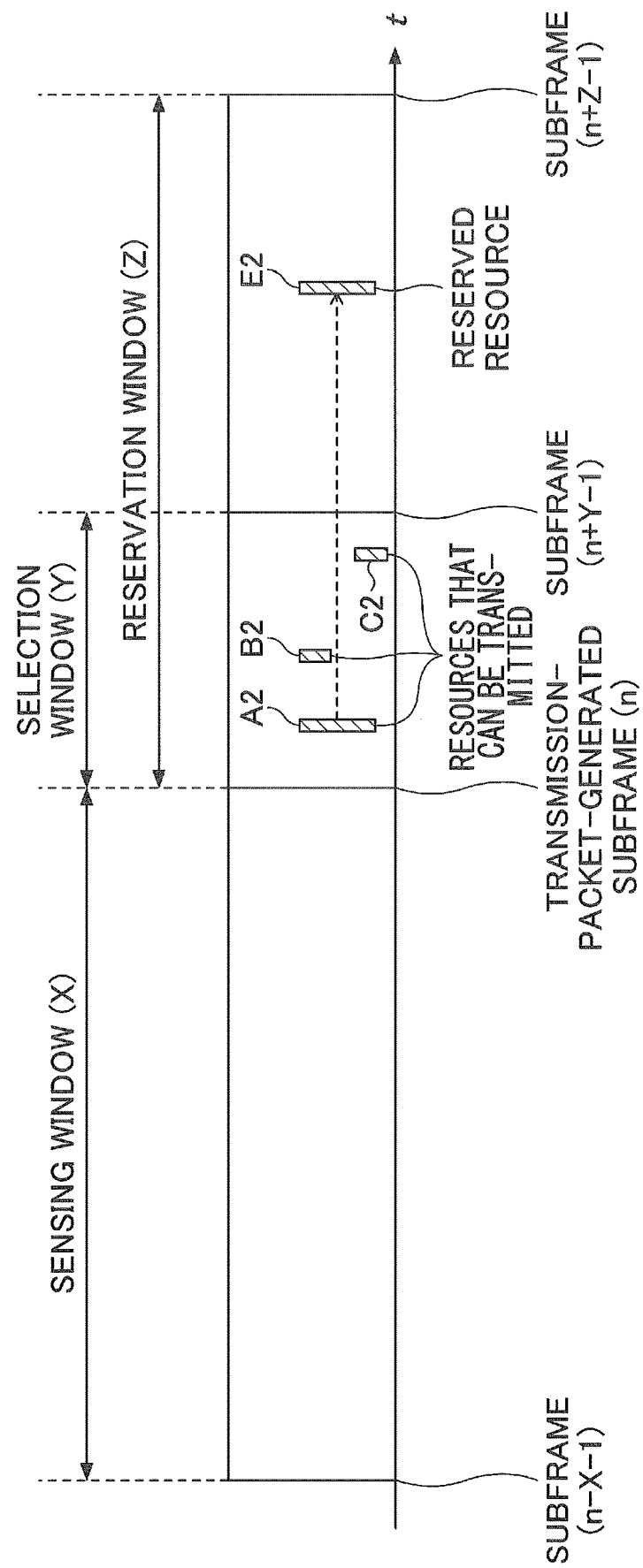
FIG. 12 is a diagram illustrating a configuration method (configuration method 1) of the start timing and the end timing of each window.

FIG. 12 is a diagram illustrating the configuration method (configuration method 1) of the start timing and the end timing of each window. In FIG. 12, it is assumed that the size of the sensing window is (X), the size of the selection window is (Y), and the size of the reservation window is (Z).

Assuming that the timing at which the user equipment UE selects a resource for transmitting the D2D signal is a subframe (n), the start timing and the end timing of the sensing window are a subframe (n−X−1) and a subframe (n−1), respectively. In addition, the start timing and the end timing of the selection window are the subframe (n) and a subframe (n+Y−1), respectively. In addition, the start timing and the end timing of the reservation window are the subframe (n) and a subframe (n+Z−1), respectively. That is, in the configuration method 1, the start timing and the end timing of the sensing window, the selection window, and the reservation window slide according to the passage of time. In addition, since the sensing window has already been completed at the timing at which the user equipment UE selects a resource for transmitting the D2D signal, the user equipment UE needs to perform sensing regardless of the presence or absence of a packet (D2D signal), which is to be transmitted, in order to check resources that can be transmitted.

According to the configuration method 1, since the start timing of the selection window matches a timing at which the user equipment UE starts an operation of selecting a resource for transmitting the D2D signal, the user equipment UE can start transmission of the D2D signal with as little delay as possible.

[Supplementary Matters Regarding the Configuration Method 1]

Figure 13:
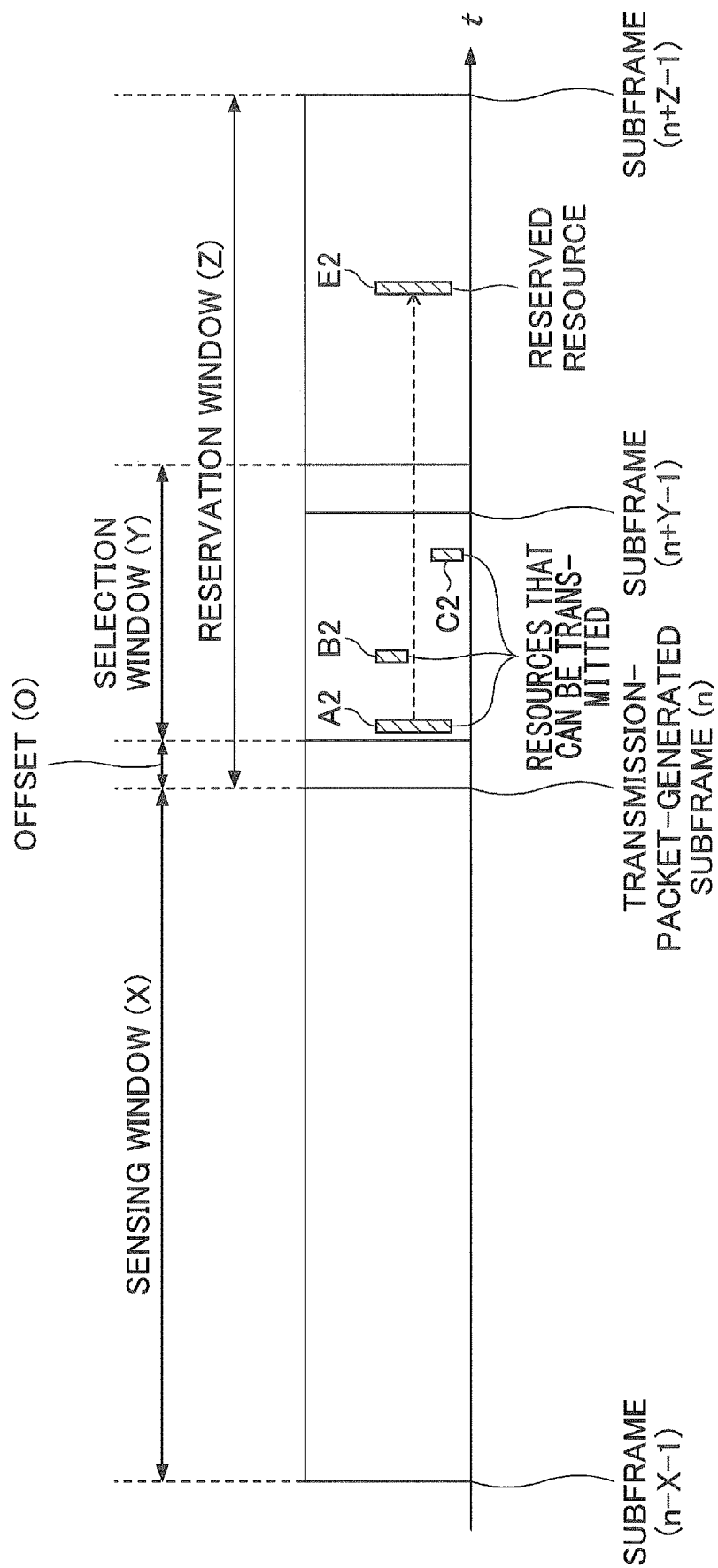
FIG. 13 is a diagram illustrating a case where an offset is set in the configuration method (configuration method 1)

FIG. 13 shows an example of a case of setting an offset (O) between the end timing of the sensing window and the start timing of the selection window in the configuration method 1. By providing the offset, the D2D signal can be actually transmitted after the offset time has passed from the generation of the D2D signal to be transmitted. Therefore, it is possible to reduce the processing load on the user equipment UE.

In the configuration method 1, the size of the selection window may be limited to one subframe. This allows the user equipment UE to start transmitting the D2D signal with a minimum delay although the possibility of signal collision between the units of user equipment UE increases.

Figure 14:
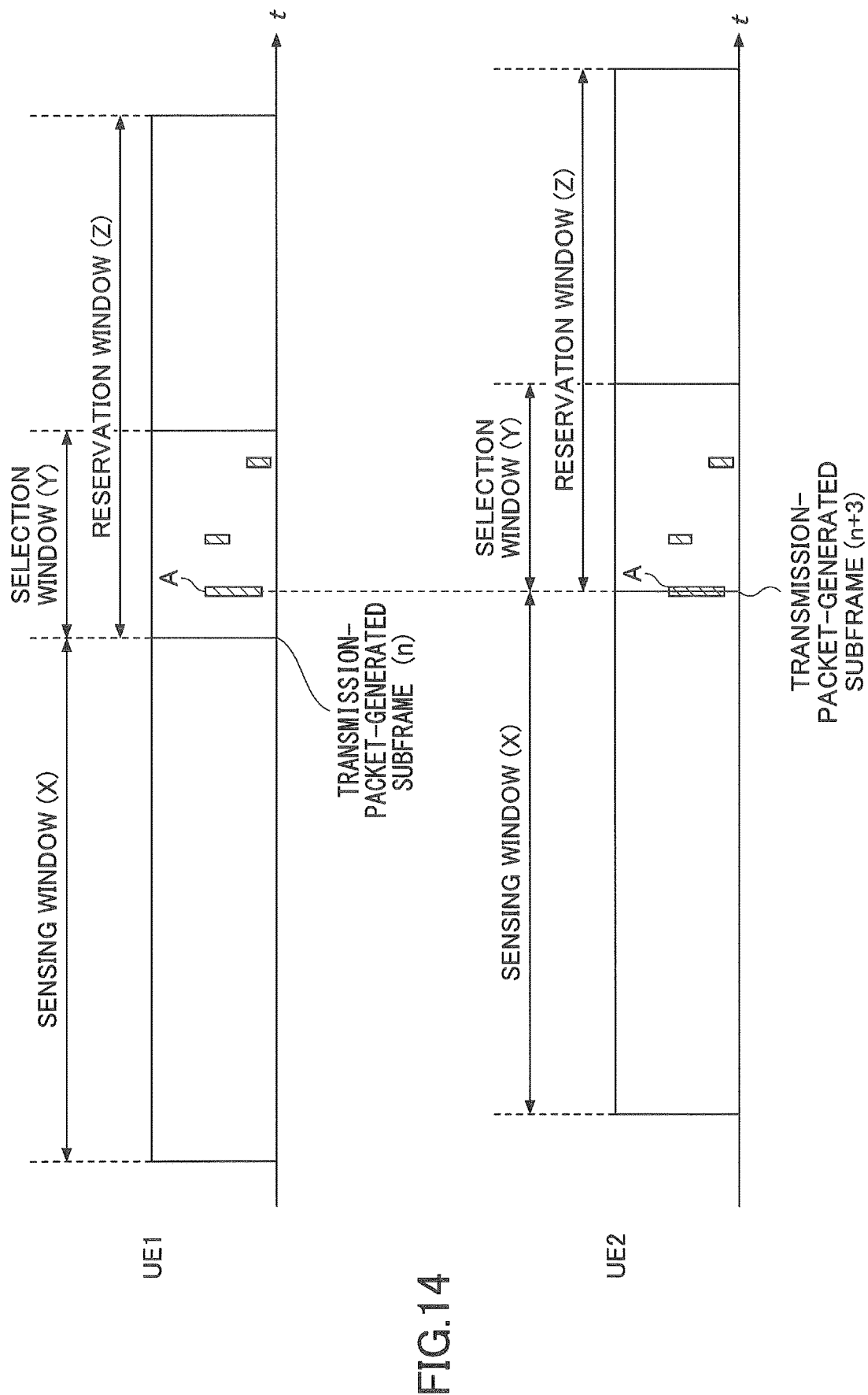
FIG. 14 is a diagram illustrating a case where resources to be selected overlap each other.

In the configuration method 1, a case is assumed in which, in the case of trying to transmit the D2D signal with a selected resource, another user equipment UE selects the same resource. Explanation will be given specifically with reference to FIG. 14. For example, it is assumed that the user equipment UE1 selects a resource A of a subframe (n+3) by performing an operation of selecting a resource for transmitting the D2D signal at the timing of the subframe (n). In this case, it is further assumed that the user equipment UE2 selects the resource A by performing an operation of selecting a resource for transmitting the D2D signal at the timing of the subframe (n+3). In this case, since both the user equipment UE1 and the user equipment UE2 transmit the D2D signal with the resource A, signal collision occurs. Therefore, in order to avoid such a situation, the user equipment UE may transmit a D2D signal (for example, SCI), which includes reservation information indicating that the selected resource is reserved, at the timing of selecting a resource for transmitting the D2D signal. Specifically, the user equipment UE1 may transmit the D2D signal including reservation information indicating that the resource A is reserved at the timing of the subframe (n) in FIG. 14. Therefore, since the user equipment UE2 can receive the D2D signal and recognize that the resource A is reserved, it is possible to avoid the selection of the resource A.

In the present embodiment, in a case where D2D communication is performed such that the same SCI and data are repeatedly transmitted within the SC period, configuration method 2 to be described later may be applied, or a part of the start timing or the end timing of each window may be adjusted to the timing of the boundary of the SC period in the configuration method 1.

(Configuration Method 2)

In the configuration method 2, the start timing and the end timing of the sensing window, the selection window, and the reservation window are adjusted to the timing of the boundary of a periodic period set in advance. The periodic period set in advance may be an "SC period", or may be other periodic periods without being limited thereto. Hereinafter, a case where the periodic period is the "SC period" will be described as an example.

Figure 15:
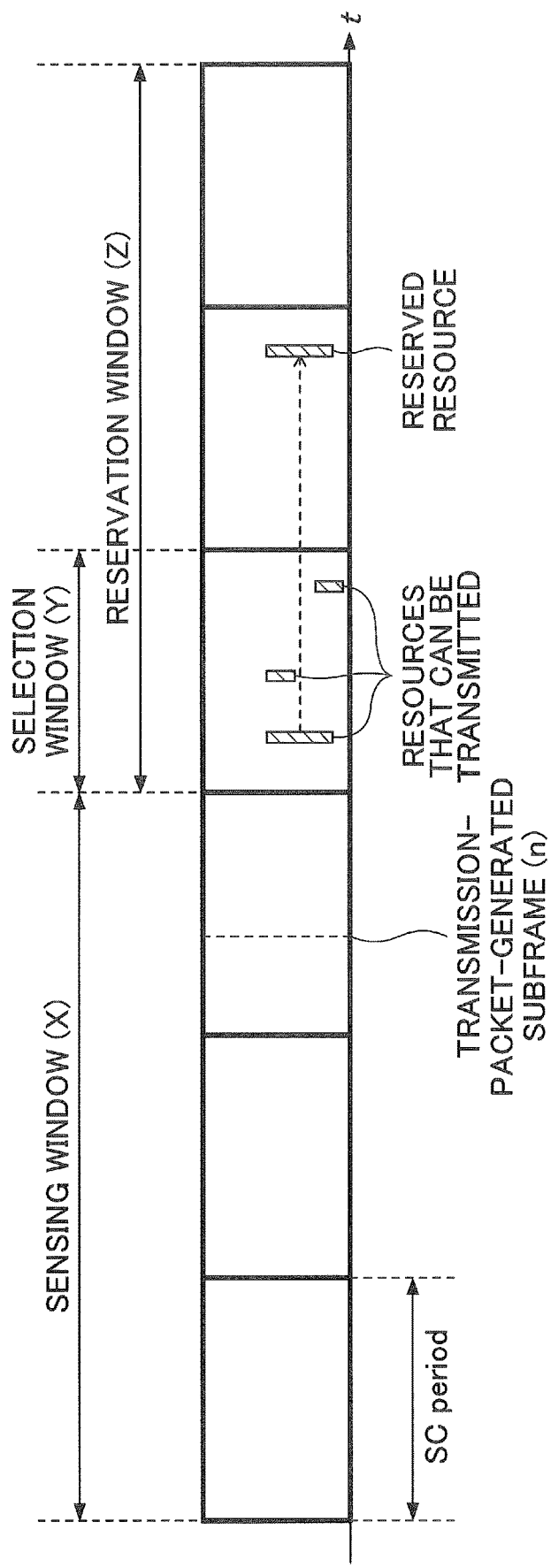
FIG. 15 is a diagram illustrating a configuration method (configuration method 2) of the start timing and the end timing of each window.

FIG. 15 is a diagram illustrating the configuration method (configuration method 2) of the start timing and the end timing of each window. In FIG. 15, it is assumed that the size of the sensing window is (X), the size of the selection window is (Y), and the size of the reservation window is (Z).

In the configuration method 2, assuming that the timing at which the user equipment UE selects a resource for transmitting the D2D signal is the subframe (n), the start timing of the selection window corresponds to the boundary between the SC period including the subframe (n) and the next SC period. Accordingly, depending on the timing of the subframe (n), the user equipment UE needs to wait for about one SC period at the maximum before starting transmission of the D2D signal. On the other hand, in a case where D2D communication is performed such that the same SCI and data are repeatedly transmitted within the SC period, for example, as in the D2D technology (technology described in the above <Overview of D2D>) of 3GPPRel-12, the start timing and the end timing of each window match the boundary of the SC period in the configuration method 2. Therefore, since the user equipment UE can sense all the D2D signals that are repeatedly transmitted by the other units of user equipment UE, it is possible to more appropriately detect the occupancy status of resources.

Figure 16:
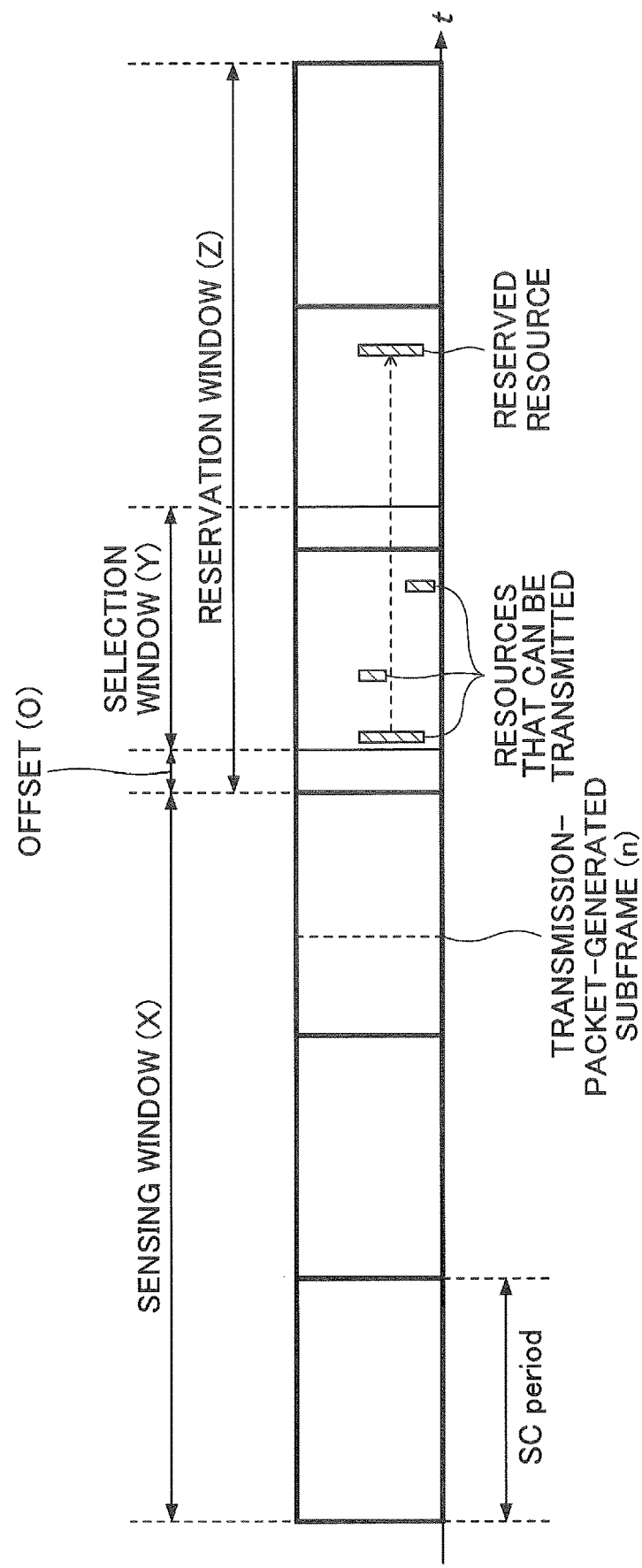
FIG. 16 is a diagram illustrating a case where an offset is set in the configuration method (configuration method 2)

FIG. 16 shows an example of a case of setting the offset (O) between the end timing of the sensing window and the start timing of the selection window in the configuration method 2. By providing the offset, even if a D2D signal to be transmitted is generated near the end timing of the sensing window, the D2D signal can be transmitted after the passage of the offset time. Therefore, it is possible to reduce the processing load on the user equipment UE. In addition, in a case where the period of transmitting the D2D signal semi-persistently almost matches the boundary of the SC period, even if the timing at which a packet to be transmitted arrives at the lower layer is delayed to pass the SC period, it is possible to transmit the D2D signal without waiting for the next SC period. As a result, it is possible to minimize the delay.

<Method of Setting Start Timing and End Timing of Each Window in User Equipment>

In the present embodiment, the start timing and the end timing of each window may be set (notified) in the user equipment using the following methods.

In addition, in the case of setting the start timing and the end timing of each window in the user equipment UE, for example, the above-described X, Y, Z, and O values may be set in the user equipment UE, or the SFN and the subframe position corresponding to the start timing and the end timing of each window may be set in the user equipment UE. Without being limited to these, the start timing and the end timing of each window may be set in the user equipment UE using any method.

As a first method, it is also possible to notify (broadcast) each user equipment UE of the start timing and the end timing of each window using the broadcast information (SIB) from the base station eNB. In addition, the start timing and the end timing of each window may be set individually in the user equipment UE using the RRC signal from the base station eNB, or may be pre-configured individually in the user equipment UE through a Subscriber Identity Module (SIM) or a core network.

In the case of setting the start timing and the end timing of each window individually in the user equipment UE, the base station eNB may set different start timing and end timing in each user equipment UE. In addition, the base station eNB may change the start timing and the end timing, which are set in each user equipment UE, according to a predetermined priority. The predetermined priority may be, for example, the priority of the user equipment UE itself, or may be the priority of the resource pool in which the user equipment UE transmits a V2X packet or the priority of a bearer (bearer used in D2D is assumed). This makes it possible, for example, to set the size of the selection window to be smaller than that of the normal user equipment UE for the user equipment UE that needs to transmit a less delayed V2X packet.

In addition, in the case of setting the start timing and the end timing of each window individually in the user equipment UE, the user equipment UE may ask the base station eNB about the start timing and the end timing of each window each time the transmission of a V2X packet is performed. In this case, the user equipment UE may ask the base station eNB to notify the user equipment UE of the traffic type of the V2X packet, the congestion state of a cell (carrier), and the like.

In addition, the size of the offset (value of O) may be set so as to be variable according to the characteristics of the traffic (characteristics of the V2X packet) transmitted by the user equipment UE. In addition, a value larger than a variation in timing at which a packet is periodically generated in an upper layer (V2X application or the like) may be set. For example, a packet is generated at a period of 100 ms. In practice, however, in a case where a deviation of about ±2 ms occurs, the size of the offset may be set to 3 ms or more (three subframes or more).

As a second method, the user equipment UE may autonomously select an arbitrary candidate from candidates for the start timing and the end timing of each window set in advance.

As a third method, the start timing and the end timing of each window may be fixedly associated with the SC period. For example, in the configuration method 2 described above, the values of X, Y, and Z may be fixedly determined in advance by standard specifications or the like.

As a fourth method, the start timing and the end timing of each window may be fixedly determined. For example, in the configuration method 1 described above, the values of X, Y, Z, and O may be fixedly determined in advance by standard specifications or the like.

In addition, the base station eNB may allow the user equipment UE to set which method of the "configuration method 1" and the "configuration method 2" is to be used, in addition to the start timing and the end timing of each window. In addition, the user equipment UE may support both the "configuration method 1" and the "configuration method 2", or may support only of the "configuration method 1" and the "configuration method 2".

<Regarding Resource Selection/Resource Reservation According to Priority>

(Resource Selection Choice According to Priority)

In the "(resource selection method in a selection window)" described above, the user equipment UE randomly selects a resource from a plurality of resources or selects a resource from a plurality of resources based on predetermined conditions. However, in V2X, it is assumed that the user equipment UE performs packet transmission with a high priority (for example, packet transmission for notification of the occurrence of an accident). In addition, it is assumed that the user equipment UE with a high priority (for example, an emergency vehicle) is set apart from the normal user equipment UE (for example, a general vehicle).

Figure 17:
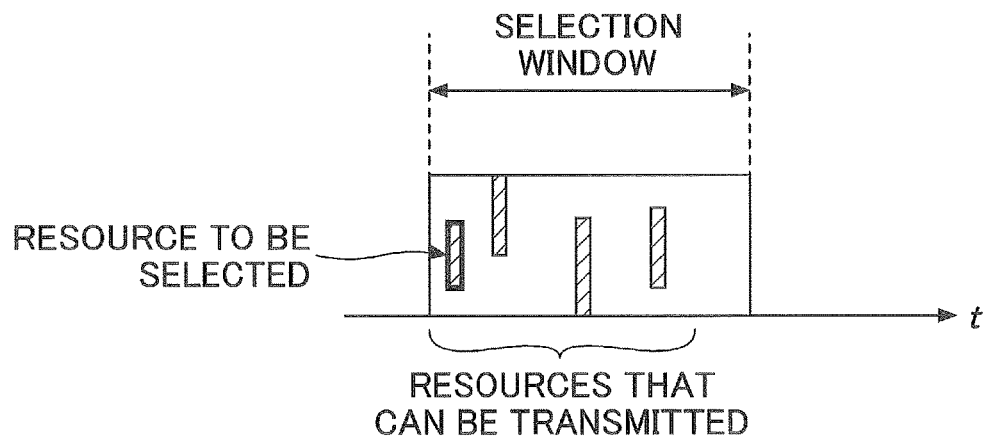
FIG. 17 is a diagram illustrating a resource selection operation in a case where the priority is high.

Therefore, in a case where the priority of a packet to be transmitted is high or in a case where the priority of the user equipment UE itself is high, the user equipment UE may select a resource with the least delay from a plurality of resources selectable in the selection window as shown in FIG. 17. In addition, as another method, in a case where the configuration method 1 described above is applied, the user equipment UE with a high priority may set the size of the selection window to one subframe.

(Resource Reservation According to Priority)

Figure 18:
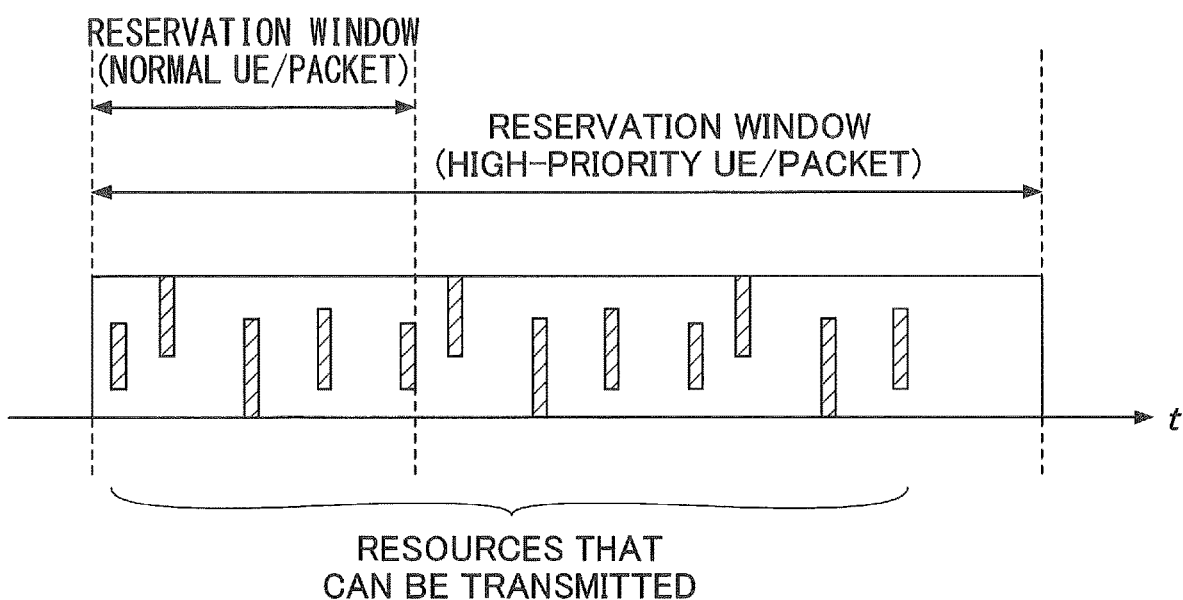
FIG. 18 is a diagram illustrating a resource reservation operation when the priority is high.

In a case where the priority of a packet to be transmitted is high or in a case where the priority of the user equipment UE itself is high, the user equipment UE may reserve a resource beyond the range of the reservation window or within a wide reservation window set individually in the user equipment UE. For example, as shown in FIG. 18, a reservation window corresponding to a case where the priority of a packet to be transmitted is high or a case where the priority of the user equipment UE itself is high may be set, and the user equipment UE may reserve a resource within the reservation window. Accordingly, for example, even in a case where all the resources are reserved in the reservation window and accordingly it is not possible to transmit the D2D signal, the user equipment UE can transmit the D2D signal.

<Regarding an Operation in a Case where there is No Resource Capable of Transmitting Signals in the Selection Window>

In a situation where many units of user equipment UE are transmitting D2D signals, a case is assumed in which there is no resource capable of transmitting the D2D signal within the selection window. In addition, in such a situation, even if a resource that can be transmitted is detected, there is a high possibility that signal collision will occur since a plurality of units of user equipment UE select the resource.

Therefore, in the present embodiment, in a case where there is no resource that can be transmitted in the selection window, the user equipment UE may temporarily increase (for example, double) the size of the selection window with the size of the sensing window as an upper limit. In this case, the user equipment UE causes the size of the selection window to return to the original size after selecting the resource. Accordingly, since a resource selected by each user equipment UE is randomized, it is possible to reduce the possibility of signal collision. The change of the sensing window size may be performed autonomously by the user equipment UE in a case where there is no selectable resource, or the user equipment UE may report that to the base station eNB and the base station eNB may change the size of the sensing window using upper layer signaling (RRC message or the like) or broadcast information (SIB). In the latter case, since it is possible to extend the sensing window including the neighboring user equipment UE, a high randomization effect is expected while the delay is large.

In addition, as another method, in a case where there is no resource that can be transmitted in the selection window, the user equipment UE may select a resource again after a predetermined back off time has passed. Although the predetermined back off time is arbitrary, the predetermined back off time may be the same as the size of the sensing window, for example. In a case where the back off time is set to one subframe, the probability of collision increases, but the delay according to resource reselection can be reduced. In addition, in a case where there is no resource that can be transmitted in the selection window continuously, the predetermined back off time may be gradually extended. For example, in a case where the predetermined back off time is set to T time, the user equipment UE may operate such that the second resource selection is performed after the passage of T time, the third resource selection is performed after the passage of T×2 (or T×4) time, and the fourth resource selection is performed after the passage of T×3 (or T×6) time. Therefore, it is possible to avoid a situation in which a plurality of units of user equipment UE perform resource selection frequently and repeatedly. In addition, in order to randomize the back off time between the units of user equipment UE, a back off time unique to the user equipment UE of T×N may be set in the user equipment UE using a random value N within a certain range.

In addition, as another method, the user equipment UE may notify its own upper layer (for example, a V2X application) or the base station eNB that there is no resource that can be transmitted in the selection window. Therefore, the upper layer of the user equipment UE can determine that the radio resources are congested, and take measures such as increasing the transmission period of the V2X packet. In addition, it is also possible to notify each user equipment UE that the radio resources are congested through the base station eNB.

In addition, in a broad sense, even a case of reselecting a resource by detecting a resource conflict or the like can be regarded as a type of the case where there is no resource capable of transmitting the D2D signal in the selection window. Accordingly, an increase in the resource conflict rate due to excessive resource reselection can be reduced by applying the operation described in "<Regarding an operation in a case where there is no resource capable of transmitting signals in the selection window>".

The extension of the selection window and the application of the back off time described above are trade-offs between the resource conflict probability and the delay due to resource reselection. Accordingly, the size for extending the selection window and the back off time may be set such that different sizes and times are applied according to the user equipment UE and the priority of a packet. For example, parameters relevant to each user equipment UE may be set from the base station eNB, or parameters may be defined in advance for each priority level, or notification using broadcast information, pre-configuration, or the like may be sent.

<Regarding Random Resource Selection>

The user equipment UE may use resource selection using sensing only at the time of resource reselection, and may randomly select a resource within the selection window without performing sensing in resource selection at the time of first transmission. For example, the user equipment UE may start sensing in a case where a counter based on the number of times of transmission of the D2D signal or elapsed time after transmission start reaches a certain value, and may stop the sensing when the counter becomes equal to or less than the certain value by resetting of the counter due to resource selection or the like. In this case, it is not possible to use the sensing result when transmitting a new packet at an arbitrary timing. However, since it is not necessary to always perform sensing in the background, it is possible to reduce the battery consumption of the user equipment UE. Transmission resource pools used in random resource selection and sensing-based resource selection may be different. For example, a resource selection method applicable to each resource pool may be set (in advance) in the user equipment UE in the upper layer.

In addition, in a case where it is detected that the interference level (or RSSI) is equal to or greater than a predetermined threshold value as a result of sensing (Measurement), the user equipment UE may fall back to random resource selection from sensing-based resource selection. Since the number of candidates for resource selection increases, the interference randomization effect is expected. The user equipment UE may determine whether or not to perform such an operation depending on the number of sensed resources and the number of sensed subframes, the number of candidates for selection resources, and/or terminal capability. The threshold value of the interference level may be set (in advance) in the user equipment UE in the upper layer. In addition, for example, in a case where the number of selectable resources is equal to or less than a certain number (rate) as a result of sensing, the user equipment UE may fall back to random resource selection without adjusting the aforementioned predetermined threshold value or the like. In particular, since sensing is performed only for partial subframes, this is effective in a case where the number of resources to be selected is small. In addition, in the case of using a method, such as selecting a resource from top X % resources with less interference, in sensing, the user equipment UE may change the rate according to the number of sensed resources and the number of sensed subframes, the number of candidates for selection resources, and/or terminal capability. In a case where the absolute number of resource candidates is small, the randomization effect can be obtained by setting a larger value as X. X may be set according to the above-described conditions (the number of sensed resources and the number of sensed subframes, the number of candidates for selection resources, and/or terminal capability), or may be set (in advance) in the user equipment UE by upper layer signaling. In addition, the user equipment UE may perform random resource selection in a case where the measurement result of top X % resources is equal to or greater than a predetermined threshold value.

The user equipment UE may change the size of the selection window that can be taken in the case of performing the sensing-based resource selection and the case of performing the random resource selection. For example, in the case of performing the random resource selection, the randomization effect may be increased by specifying a larger selection window size to be selected. The size of the selection window may be set for each packet priority or resource pool.

The user equipment UE may relax the sensing procedure depending on the terminal capability or the resource pool setting. For example, although sensing can be configured to include a step based on decoding or measurement of control information and a step based on power detection (RSSI measurement or the like), the user equipment UE may execute only the step based on power detection between these steps. In this case, since the user equipment UE does not need blind detection of control information, it is possible to reduce terminal cost and power consumption.

<Regarding Exclusion of Resource Selection Candidate>

In the embodiment described so far, in the case of transmitting the D2D signal semi-persistently, it is a prerequisite to allow the user equipment UE to perform sensing before starting transmission of the D2D signal first and to transmit the D2D signal with the selected resource in the subsequent period. In addition, since the user equipment UE transmits the D2D signal with periodic resources after the selected resource, sensing is not performed (sensing is skipped) in resources for transmitting the D2D signal from the second time. If the user equipment UE operates in this manner, the same user equipment UE cannot continue to use the same resource. Therefore, in resources, for which sensing has not been performed (has been skipped) since the resources are resources for transmitting the D2D signal, and the subsequent period, the user equipment UE may regard that the resources are occupied, and may uniformly exclude the resources from the resource selection candidates.

However, if the resources are uniformly excluded from the resource selection candidates, resource options that can be selected in the selection window are restricted. Therefore, as another method, instead of uniformly excluding resources that have not been sensed and periodic resources thereafter from the resource selection candidate in the selection window, the user equipment UE may determine whether or not to exclude these resources from the resource selection candidates based on the result of virtual measurement of the resources. Measuring resources virtually refers to considering measurement results, which are set (in advance), as measurement results in the corresponding resource. As a result of virtual measurement of resources, for example, a measurement result of resources of subframes different from resources to be measured may be used. In addition, in the same frequency domain as resources to be measured, a measurement result of resources having a certain time relationship with the resources may be used. In addition, the user equipment UE may prioritize the resource selection candidates based on the result of virtual measurement of resources.

More specifically, for example, assuming that the subframe of a resource for which sensing has not been performed is n, a resources period (can also be expressed as a resource reservation unit) is X, and k is a positive integer (may be limited to k=1, 2, 3, ..., 10), the resource for which sensing has not been performed and periodic resources thereafter can be expressed as resources of subframes expressed as n+X×k. That is, instead of uniformly excluding the resources of subframes expressed as n+X×k from the resource selection candidates, the user equipment UE may exclude the resources of subframes expressed as n+X×k from the resource selection candidates in a case where the virtual resource measurement result is equal to or greater than (or exceeds) a predetermined threshold value, and may determine the resources of subframes expressed as n+X×k as resource selection candidates in a case where the virtual resource measurement result is less than (or equal to or less than) the predetermined threshold value.

The virtual resource measurement result may be, for example, Sidelink-RSSI (S-RSSI), PSCCH-RSRP, or PSSCH-RSRP. More specifically, the virtual resource measurement result may be the power detection result of resources to be measured, the received power of DM-RS transmitted through PSCCH or PSSCH, or the like. The virtual resource measurement result may be pre-configured in the user equipment UE, or may be set in the user equipment UE using broadcast information (SIB) or RRC signaling. By setting "+ infinity" for the virtual resource measurement result, it is possible to uniformly exclude the resources substantially from the resource selection candidates. Conversely, by setting "− infinity" for the virtual resource measurement result, it is possible to set the resources substantially as resource selection candidates.

In addition, the predetermined threshold value may be a predefined value, or may be pre-configured in the user equipment UE, or may be set in the user equipment UE using broadcast information (SIB) or RRC signaling.

In addition, the virtual resource measurement result and the predetermined threshold value can be set for each of priority information of a packet transmitted by the user equipment UE, a resource pool, and a carrier for transmitting the D2D signal. For example, for a packet with high priority, by setting a small value for the virtual resource measurement result, it is possible to increase a transmission opportunity. In addition, the virtual resource measurement result may be made to be variable according to the size of the resource selection window.

Through the operation described above, the user equipment UE can suppress unnecessary restrictions on the resource options that can be selected in the selection window. In addition, even in a case where the length of the selection window is short, it is possible to secure resource options.

<Functional Configuration>

Functional configuration examples of the user equipment UE and the base station eNB that perform the operations of the above-described plurality of embodiments will be described.

(User Equipment)

Figure 19:
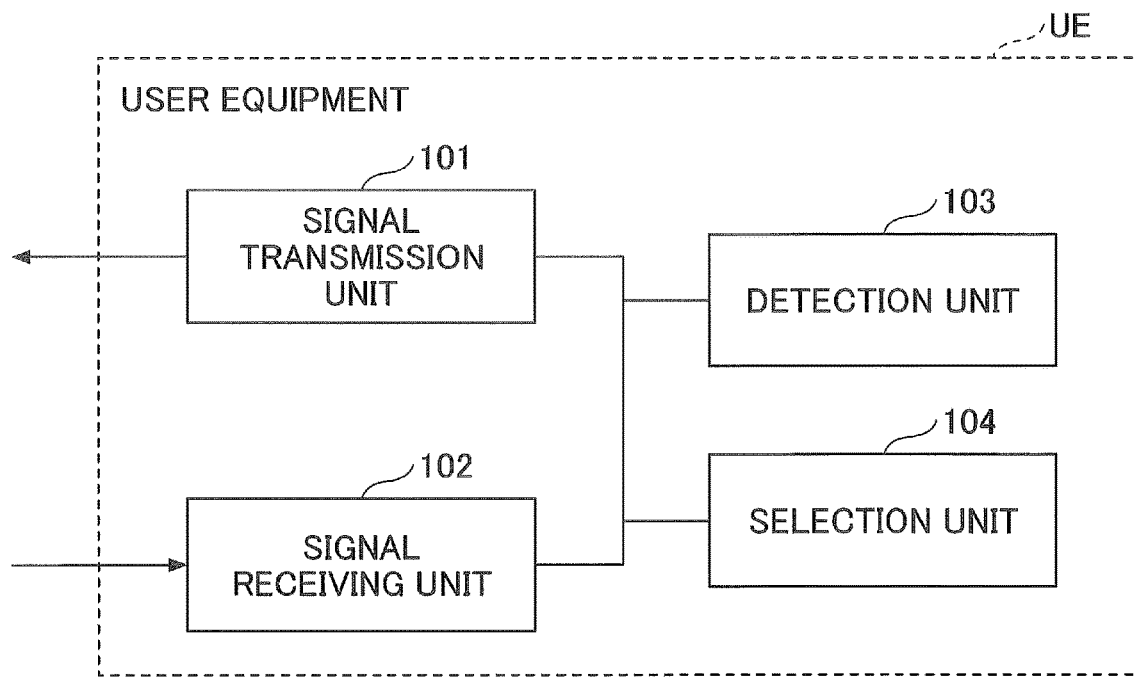
FIG. 19 is a diagram illustrating an example of the functional configuration of user equipment according to an embodiment.

FIG. 19 is a diagram showing an example of the functional configuration of user equipment according to an embodiment. As shown in FIG. 19, the user equipment UE has a signal transmission unit 101, a signal receiving unit 102, a detection unit 103, and a selection unit 104. In addition, FIG. 19 shows only functional units particularly relevant to the embodiment of the invention in the user equipment UE, and there is also a function (not shown) for performing at least an operation conforming to LTE. In addition, the functional configuration shown in FIG. 19 is just an example. As long as the operation according to the present embodiment can be performed, any functional division and any name of each functional unit can be used.

However, a part of the processing (some of the configuration methods, selection methods, or the like) of the user equipment UE described so far may be executable.

The signal transmission unit 101 includes a function of generating various kinds of signals of the physical layer from signals of the upper layer to be transmitted from the user equipment UE and wirelessly transmitting the signals. In addition, the signal transmission unit 101 has a D2D signal transmission function and a transmission function of cellular communication. In addition, the signal transmission unit 101 has a function of transmitting the D2D signal using a resource selected by the selection unit 104.

In addition, the signal transmission unit 101 may transmit reservation information, which indicates that transmission of a signal is scheduled with the "resource for reserving transmission of the D2D signal" selected by the selection unit 104, using the resource for transmitting the D2D signal.

The signal receiving unit 102 includes a function of wirelessly receiving various kinds of signals from the other units of user equipment UE or the base station eNB and acquiring a signal of a higher layer from the received signal of the physical layer. In addition, the signal receiving unit 102 has a D2D signal receiving function and a reception function of cellular communication.

The detection unit 103 has a function of detecting one or more resources capable of transmitting the D2D signal in the selection window after the sensing window by performing sensing in the sensing window. In addition, the detection unit 103 may detect one or more resources capable of reserving transmission of the D2D signal in the reservation window after the sensing window by performing sensing in the sensing window. In addition, the detection unit 103 may virtually measure the reception quality of periodic resources by performing sensing in the sensing window for periodic resources after a resource selected in the selection window, and detect one or more resources capable of transmitting the D2D signal in the selection window based on the measured virtual reception quality. In addition, the detection unit 103 may determine that a resource, for which the measured virtual reception quality is equal to or less than a predetermined threshold value, is a resource that can transmit the D2D signal in the selection window. In addition, the detection unit 103 may determine that a resource, for which the measured virtual reception quality is equal to or greater than a predetermined threshold value, is not a resource that can transmit the D2D signal in the selection window.

The selection unit 104 has a function of selecting a resource for transmitting the D2D signal from one or more resources detected by the detection unit 103. In addition, in a case where a plurality of resources are detected by the detection unit 103, the selection unit 104 may determine autonomously or based on an instruction from the base station eNB whether to randomly select a resource for transmitting the D2D signal from the plurality of resources or to select a resource based on predetermined conditions. In addition, the selection unit 104 may select a resource for reserving transmission of the D2D signal from one or more resources that can reserve transmission of the D2D signal detected by the detection unit 103.

(Base Station)

Figure 20:
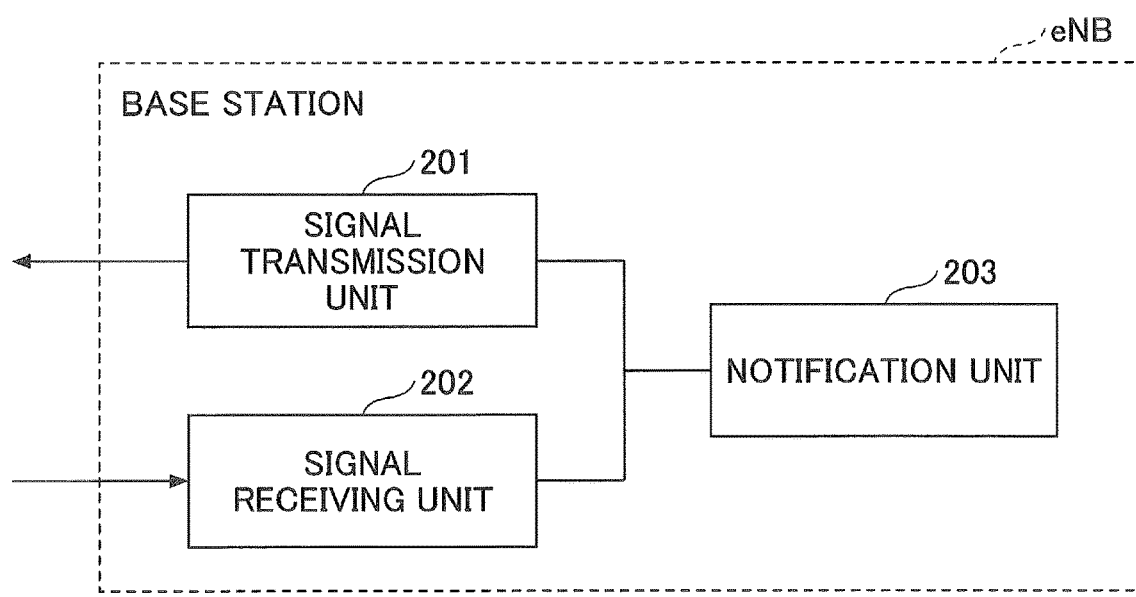
FIG. 20 is a diagram illustrating an example of the functional configuration of a base station according to an embodiment.

FIG. 20 is a diagram showing an example of the functional configuration of a base station according to an embodiment. As shown in FIG. 20, the base station eNB has a signal transmission unit 201, a signal receiving unit 202, and a notification unit 203. In addition, FIG. 20 shows only functional units particularly relevant to the embodiment of the invention in the base station eNB, and there is also a function (not shown) for performing at least an operation conforming to LTE. In addition, the functional configuration shown in FIG. 20 is just an example. As long as the operation according to the present embodiment can be performed, any functional division and any name of each functional unit can be used.

The signal transmission unit 201 includes a function of generating various kinds of signals of the physical layer from signals of the upper layer to be transmitted from the base station eNB and wirelessly transmitting the signals. The signal receiving unit 202 includes a function of wirelessly receiving various kinds of signals from the user equipment UE and acquiring a signal of a higher layer from the received signal of the physical layer.

The notification unit 203 notifies the user equipment UE of various kinds of information, which are used when the user equipment UE performs the operation according to the present embodiment, using the broadcast information (SIB) or RRC signaling. In addition, the various kinds of information are, for example, information indicating the configuration of a resource pool, information indicating the position of the SC period, information indicating the start timing and the end timing of each window (a sensing window, a selection window, and a reservation window), information indicating which method of "configuration method 1" and "configuration method 2" is to be used, and the like.

The entire functional configuration of each of the user equipment UE and the base station eNB described above may be realized by a hardware circuit (for example, one or more IC chips), or a part of the functional configuration of each of the user equipment UE and the base station eNB described above may be formed by a hardware circuit and the other parts may be realized by a CPU and a program.

(User Equipment)

Figure 21:
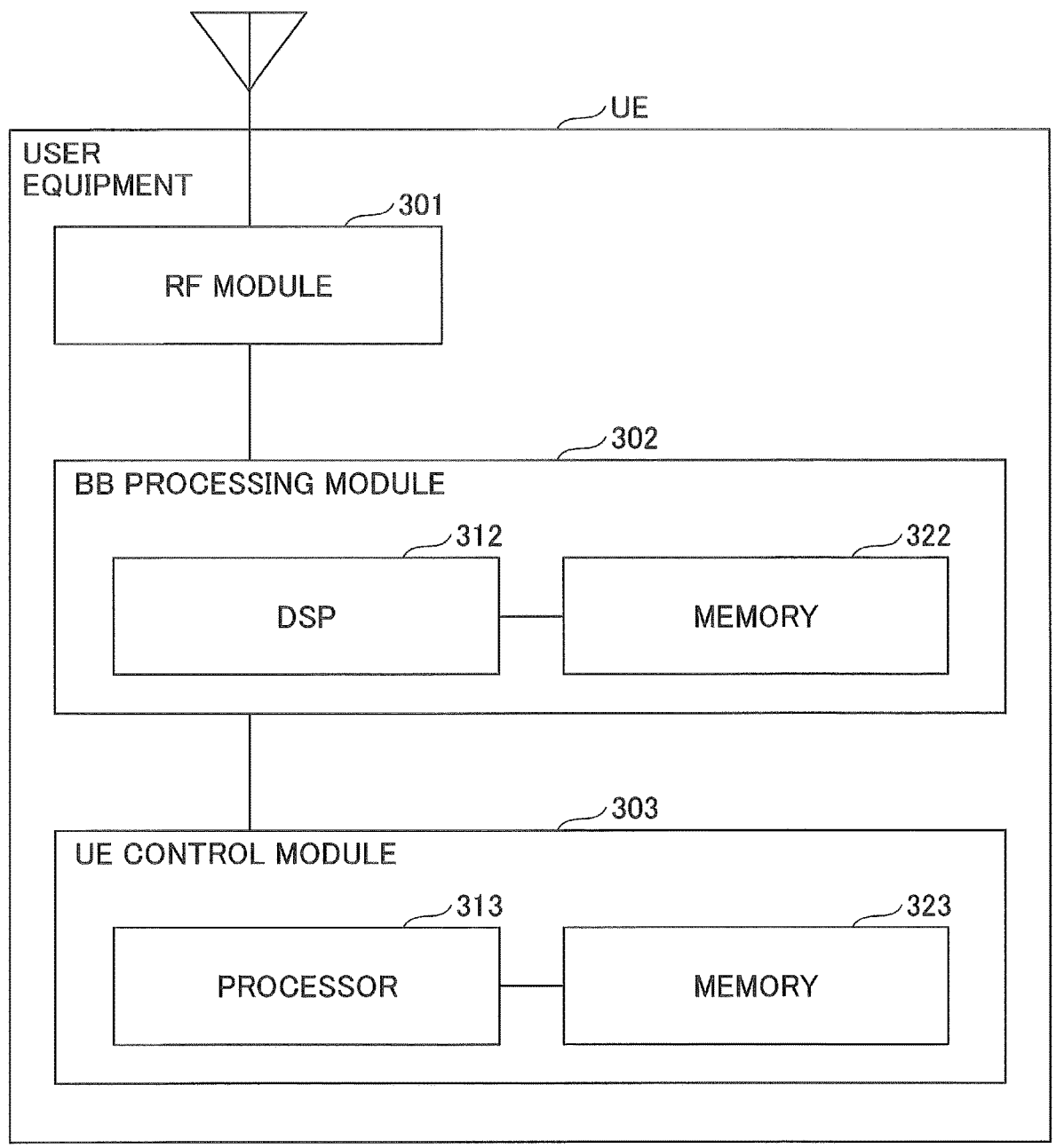
FIG. 21 is a diagram illustrating an example of the hardware configuration of user equipment according to an embodiment.

FIG. 21 is a diagram showing an example of the hardware configuration of user equipment according to an embodiment. FIG. 21 shows a configuration similar to that of the implementation example as compared with FIG. 19. As shown in FIG. 21, the user equipment UE has an Radio Frequency (RF) module 301 for performing processing relevant to radio signals, a Base Band (BB) processing module 302 for performing baseband signal processing, and a UE control module 303 for performing upper layer processing or the like.

The RF module 301 generates a radio signal to be transmitted from the antenna by performing Digital-to-Analog (D/A) conversion, modulation, frequency conversion, power amplification, and the like on the digital baseband signal received from the BB processing module 302. In addition, the RF module 301 generates a digital baseband signal by performing frequency conversion, Analog to Digital (A/D) conversion, demodulation, and the like on the received radio signal, and transmits the digital baseband signal to the BB processing module 302. The RF module 301 includes, for example, a part of the signal transmission unit 101 and a part of the signal receiving unit 102, all of which are shown in FIG. 19.

The BB processing module 302 performs processing for converting the IP packet and the digital baseband signal to each other. A Digital Signal Processor (DSP) 312 is a processor that performs signal processing in the BB processing module 302. A memory 322 is used as a work area of the DSP 312. The BB processing module 302 includes, for example, a part of the signal transmission unit 101, a part of the signal receiving unit 102, the detection unit 103, and the selection unit 104, all of which are shown in FIG. 19.

The UE control module 303 performs IP layer protocol processing, various kinds of application processing, and the like. A processor 313 is a processor that performs the processing performed by the UE control module 303. A memory 323 is used as a work area of the processor 313.

(Base Station)

Figure 22:
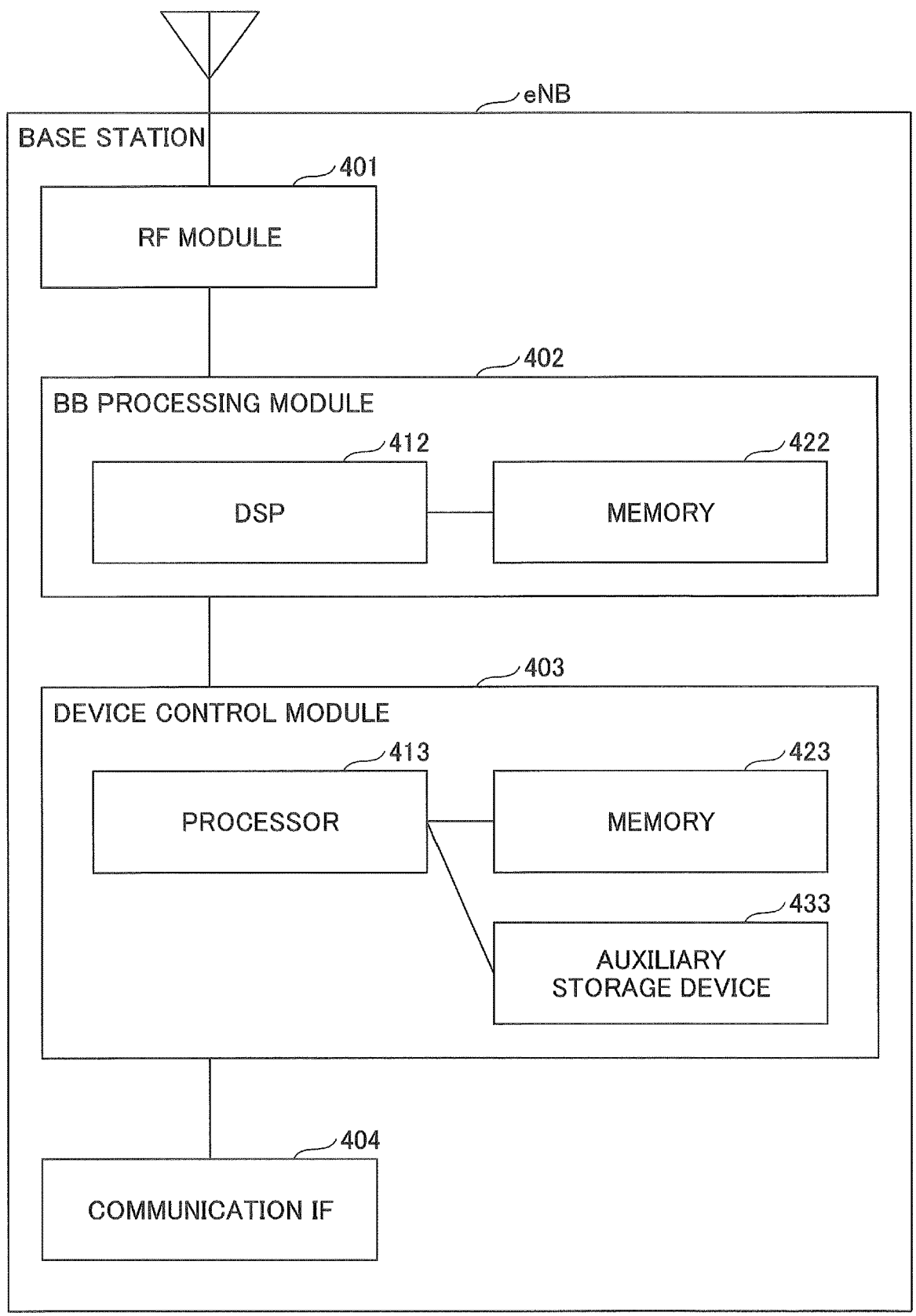
FIG. 22 is a diagram illustrating an example of the hardware configuration of a base station according to an embodiment.

FIG. 22 is a diagram showing an example of the hardware configuration of a base station according to an embodiment. FIG. 22 shows a configuration similar to that of the implementation example as compared with FIG. 20. As shown in FIG. 20, the base station eNB has an RF module 401 for performing processing relevant to radio signals, a BB processing module 402 for performing baseband signal processing, a device control module 403 for performing upper layer processing or the like, and a communication IF 404 that is an interface for connection to a network.

The RF module 401 generates a radio signal to be transmitted from the antenna by performing D/A conversion, modulation, frequency conversion, power amplification, and the like on the digital baseband signal received from the BB processing module 402. In addition, the RF module 401 generates a digital baseband signal by performing frequency conversion, A/D conversion, demodulation, and the like on the received radio signal, and transmits the digital baseband signal to the BB processing module 302. The RF module 401 includes, for example, a part of the signal transmission unit 201 and a part of the signal receiving unit 202, all of which are shown in FIG. 20.

The BB processing module 402 performs processing for converting the IP packet and the digital baseband signal to each other. A DSP 412 is a processor that performs signal processing in the BB processing module 402. A memory 422 is used as a work area of the DSP 412. The BB processing module 402 includes, for example, a part of the signal transmission unit 201 and a part of the signal receiving unit 202, all of which are shown in FIG. 20.

The device control module 403 performs IP layer protocol processing, Operation and Maintenance (OAM) processing, and the like. A processor 413 is a processor that performs the processing performed by the device control module 403. A memory 423 is used as a work area of the processor 413. An auxiliary storage device 433 is, for example, an HDD, and stores various kinds of configuration information and the like required for the base station eNB itself to operate. The device control module 403 includes, for example, the notification unit 203 shown in FIG. 20.

Summary

As described above, according to the embodiment, there is provided user equipment that selects a resource for transmitting a signal based on a sensing result. The user equipment includes: a detection unit that detects one or more resources capable of transmitting a signal in a time window for resource selection after a time window for sensing by performing sensing in the time window for sensing; a selection unit that selects a resource for transmitting a signal from one or more detected resources; and a transmission unit that transmits a signal using the selected resource for transmitting the signal. By the user equipment UE, there is provided a technique enabling appropriate communication while reducing a delay in the method of selecting a resource for transmitting a signal based on the sensing result.

In addition, the time window for resource selection may be shorter than the time window for sensing. Therefore, since the user equipment UE selects a resource in the selection window shorter than the sensing window, it is possible to shorten the delay required from the time when it is determined to transmit the D2D signal until the actual transmission of the D2D signal is started.

In addition, in a case where a plurality of resources are detected by the detection unit, the selection unit may determine autonomously or based on an instruction from a base station whether to randomly select a resource for transmitting the signal from the plurality of resources or to select a resource for transmitting the signal based on predetermined conditions. Therefore, in a case where a plurality of resources are selectable in the selection window, the user equipment UE can select a resource using various methods. In addition, in the case where of random selection, it is possible to randomize the possibility of D2D signal collision among a plurality of units of user equipment UE.

In addition, the start timing and the end timing of the time window for sensing and the start timing and the end timing of the time window for resource selection may be dynamically determined based on a timing at which the selection unit selects a resource for transmitting a signal, or may correspond to the timings of a boundary of a periodic period set in advance. In a case where the start timing and the end timing of the time window for sensing and the start timing and the end timing of the time window for resource selection are dynamically determined, the start timing of the selection window matches a timing at which the user equipment UE starts an operation of selecting a resource for transmitting the D2D signal. Accordingly, the user equipment UE can start transmission of the D2D signal with as little delay as possible. In addition, in a case where the start timing and the end timing of each window correspond to the timing of the boundary of a periodic period set in advance, the user equipment UE can sense all the D2D signals that are repeatedly transmitted in a case where other units of user equipment UE transmit the D2D signals repeatedly in the periodic period. Therefore, it is possible to more appropriately detect the occupancy status of resources.

In addition, the detection unit may detect one or more resources capable of reserving transmission of a signal in a time window for resource reservation after the time window for sensing by performing sensing in the time window for sensing. The selection unit may select a resource for reserving transmission of a signal from the one or more detected resources capable of reserving transmission of a signal. The transmission unit may transmit reservation information, which indicates that a signal is scheduled to be transmitted with a resource for reserving transmission of the signal, using a resource for transmitting the signal. Therefore, since the user equipment UE can reserve a resource, it is possible to reduce a possibility that the D2D signal transmitted by the other units of user equipment UE will interfere with the D2D signal transmitted by the user equipment UE itself.

In addition, the detection unit may virtually measure a reception quality of periodic resources by performing sensing in the time window for sensing for periodic resources after the selected resource for transmitting the signal, and detect one or more resources capable of transmitting a signal in the time window for resource selection based on the measured virtual reception quality. Therefore, the user equipment UE can suppress unnecessary restrictions on the resource options that can be selected in the selection window.

In addition, according to an embodiment, there is provided a signal transmission method executed by user equipment that selects a resource for transmitting a signal based on a sensing result. The signal transmission method includes: a step of detecting one or more resources capable of transmitting a signal in a time window for resource selection after a time window for sensing by performing sensing in the time window for sensing; a step of selecting a resource for transmitting a signal from one or more detected resources; and a step of transmitting a signal using the selected resource for transmitting a signal. By the signal transmission method, there is provided a technique enabling appropriate communication while reducing a delay in the method of selecting a resource for transmitting a signal based on the sensing result.

Supplement to Embodiments

The SC period may be referred to as a Scheduling Assignment Period (SA period), or may be referred to as a PSCCH period.

As described above, the configuration of each device (user equipment UE/base station eNB) described in the embodiment of the invention may be a configuration realized by executing a program by a CPU (processor) in a device including a CPU and a memory, or may be a configuration realized by hardware, such as a hardware circuit having a processing logic described in the present embodiment, or a program and hardware may be mixed.

While the embodiment of the invention has been described above, the disclosed invention is not limited to such an embodiment, and those skilled in the art will understand various modifications, alternatives, substitutions, and the like. For easy understanding of the invention, explanations were made using specific numerical examples. However, unless otherwise noted, these numerical values are just examples and any suitable value may be used. The division of items in the above description is not essential to the invention, and the matters described in two or more items may be used in combination when necessary or the matter described in a certain item may be applied to the matter described in another item (unless inconsistent with each other). The boundary of functional units or processing units in a functional block diagram does not necessarily correspond to the boundary of physical components. The operations of a plurality of functional units may be performed by physically one component, or the operation of one functional unit may be performed by physically plural components. The sequences and flowcharts described in the embodiment may be changed as long as there is no inconsistency. For convenience of processing explanation, the user equipment UE/base station eNB has been described using a functional block diagram. However, such a device may be implemented by hardware or software or a combination thereof. Each of software operated by the processor provided in the user equipment UE according to the embodiment of the invention and software operated by the processor provided in the base station eNB according to the embodiment of the invention may be stored in any suitable storage medium, such as a random access memory (RAM), a flash memory, a read only memory (ROM), an EPROM, an EEPROM, a register, a hard disk (HDD), a removable disk, a CD-ROM, a database, and a server.

The sensing window is an example of the time window for sensing. The selection window is an example of the time window for resource selection. The reservation window is an example of the time window for resource reservation.

Information transmission (notification, reporting) may be performed not only by methods described in an aspect/embodiment of the present specification but also a method other than those described in an aspect/embodiment of the present specification. For example, the information transmission may be performed by physical layer signaling (e.g., DCI (Downlink Control Information), UCI (Uplink Control Information)), upper layer signaling (e.g., RRC signaling, MAC signaling, broadcast information (MIB (Master Information Block), SIB (System Information Block))), other signals, or combinations thereof. Further, an RRC message may be referred to as RRC signaling. Further, an RRC message may be, for example, an RRC connection setup message, an RRC connection reconfiguration message, or the like.

An aspect/embodiment described in the present specification may be applied to a system that uses LTE (Long Term Evolution), LTE-A (LIE-Advanced), SUPER 3G, IMI-Advanced, 4G, 5G, FRA (Future Radio Access), W-CDMA (registered trademark), GSM (registered trademark), CDMA2000, UMB (Ultra Mobile Broadband), IEEE 802.11 (Wi-Fi), IEEE 802.16 (WiMAX), IEEE 802.20, UWB (Ultra-WideBand), Bluetooth (registered trademark), other appropriate systems, and/or a next generation system enhanced based thereon.

Determination or judgment may be performed according to a value (0 or 1) represented by a bit, may be performed according to a boolean value (true or false), or may be performed according to comparison of numerical values (e.g., comparison with a predetermined value).

It should be noted that the terms described in the present specification and/or terms necessary for understanding the present specification may be replaced by terms that have the same or similar meaning. For example, a channel and/or a symbol may be a signal. Further, a signal may be a message.

There is a case in which a UE may be referred to as a subscriber station, a mobile unit, subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other appropriate terms.

An aspect/embodiment described in the present specification may be used independently, may be used in combination, or may be used by switching according to operations. Further, transmission of predetermined information (e.g., transmission of "it is X") is not limited to explicitly-performed transmission. The transmission of predetermined information may be performed implicitly (e.g., explicit transmission of predetermined information is not performed).

As used herein, the term "determining" may encompasses a wide variety of actions. For example, "determining" may be regarded as calculating, computing, processing, deriving, investigating, looking up (e.g., looking up in a table, a database or another data structure), ascertaining and the like. Also, "determining" may be regarded as receiving (e.g., receiving information), transmitting (e.g., transmitting information), inputting, outputting, accessing (e.g., accessing data in a memory) and the like. Also, "determining" may be regarded as resolving, selecting, choosing, establishing, comparing and the like. That is, "determining" may be regarded as a certain type of action related to determining.

As used herein, the phrase "based on" does not mean, unless otherwise noted, "based on only". In other words, the phrase "base on" means both "based on only" and "based on at least".

Also, the order of processing steps, sequences or the like of an aspect/embodiment described in the present specification may be changed as long as there is no contradiction. For example, in a method described in the present specification, elements of various steps are presented in an exemplary order. The order is not limited to the presented specific order.

Input/output information, etc., may be stored in a specific place (e.g., memory) or may be stored in a management table. The input/output information, etc., may be overwritten, updated, or added. Output information, etc., may be deleted. Input information, etc., may be transmitted to another apparatus.

Transmission of predetermined information (e.g., transmission of "it is X") is not limited to explicitly-performed transmission. The transmission of predetermined information may be performed implicitly (e.g., explicit transmission of predetermined information is not performed).

Information, a signal, etc., described in the present specification may be represented by using any one of the various different techniques. For example, data, an instruction, a command, information, a signal, a bit, a symbol, a chip or the like described throughout in the present specification may be represented by voltage, current, electromagnetic waves, magnetic fields or a magnetic particle, optical fields or a photon, or any combination thereof.

The present invention is not limited to the above embodiments and various variations, modifications, alternatives, replacements, etc., may be included in the present invention without departing from the spirit of the invention.

The present application is based on and claims priority to Japanese patent application No. 2016-079185 filed on Apr. 11, 2016, and Japanese patent application No. 2016-192350 filed on Sep. 29, 2016, the entire contents of which are hereby incorporated by reference.

EXPLANATIONS OF LETTERS OR NUMERALS

UE user equipment
eNB base station
101 signal transmission unit
102 signal receiving unit
103 detection unit
104 selection unit
201 signal transmission unit
202 signal receiving unit
203 notification unit
301 RF module
302 BB processing module
303 UE control module
304 communication IF
401 RF module
402 BB processing module
403 device control module

The invention claimed is:
1. A terminal comprising:
a processor that detects, based on a result of sensing in a time window for sensing, one or more resources capable of transmitting a physical sidelink shared channel (PSSCH) signal in a time window for resource selection, wherein the processor selects a resource for transmitting the PSSCH signal from the one or more detected resources; and
a transmitter that transmits the PSSCH signal using the selected resource for transmitting the PSSCH signal,
wherein the processor autonomously determines a start timing and an end timing of the time window for resource selection from preset timing candidates, and
wherein an end timing of the time window for sensing is subframe (n−1) with respect to a resource selecting timing of subframe (n).

2. The terminal according to claim 1,
wherein the processor autonomously selects a start timing of the time window for resource selection from preset timing candidates, and determines an end timing of the time window for resource selection based on a timing according to a priority received from a base station.

3. The terminal according to claim 2,
wherein the processor randomly selects the resource for transmitting the PSSCH signal from the detected one or more resources.

4. The terminal according to claim 1,
wherein the processor sets an offset between the time window for sensing and the time window for resource selection.

5. The terminal according to claim 4,
wherein the processor randomly selects the resource for transmitting the PSSCH signal from the detected one or more resources.

6. The terminal according to claim 1,
wherein the processor randomly selects the resource for transmitting the PSSCH signal from the detected one or more resources.

7. A communication method of a terminal comprising:
detecting, based on a result of sensing in a time window for sensing, one or more resources capable of transmitting a physical sidelink shared channel (PSSCH) signal in a time window for resource selection;
selecting a resource for transmitting the PSSCH signal from the one or more detected resources; and
transmitting the PSSCH signal using the selected resource for transmitting the PSSCH signal,
wherein the terminal autonomously determines a start timing and an end timing of the time window for resource selection from preset timing candidates, and
wherein an end timing of the time window for sensing is subframe (n−1) with respect to a resource selecting timing of subframe (n).

* * * * *